(12) United States Patent
Honda et al.

(10) Patent No.: US 7,319,663 B2
(45) Date of Patent: Jan. 15, 2008

(54) METHOD FOR CONTROLLING SWITCHING IN BIDIRECTIONAL LINE-SWITCHED RING

(75) Inventors: Takashi Honda, Kawasaki (JP); Yusuke Ishii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 758 days.

(21) Appl. No.: 09/812,419

(22) Filed: Mar. 20, 2001

(65) Prior Publication Data

US 2002/0039348 A1 Apr. 4, 2002

(30) Foreign Application Priority Data

Sep. 29, 2000 (JP) ............................. 2000-300620

(51) Int. Cl.
*H04J 1/16* (2006.01)
*H04L 1/00* (2006.01)

(52) U.S. Cl. ...................... 370/217; 370/222; 370/223; 370/225; 370/221; 370/351

(58) Field of Classification Search ........ 370/216–228, 370/907, 403, 386, 258, 404, 351, 244, 396, 370/249, 405, 248, 409, 256; 714/4, 43; 709/251; 359/124, 110
See application file for complete search history.

(56) References Cited

U.S. PATENT DOCUMENTS

| | | | |
|---|---|---|---|
| 5,479,608 A * | 12/1995 | Richardson | 714/4 |
| 5,550,805 A * | 8/1996 | Takatori et al. | 370/222 |
| 6,122,250 A * | 9/2000 | Taniguchi | 370/222 |
| 6,144,633 A * | 11/2000 | Ikeda et al. | 370/217 |
| 6,256,292 B1 * | 7/2001 | Ellis et al. | 370/227 |
| 6,269,452 B1 * | 7/2001 | Daruwalla et al. | 714/4 |
| 6,349,092 B1 * | 2/2002 | Bisson et al. | 370/258 |

(Continued)

FOREIGN PATENT DOCUMENTS

EP 0 996 309 4/2000

(Continued)

OTHER PUBLICATIONS

Notice of Reasons for Rejection dated Sep. 13, 2005 from corresponding Japanese Application 2000-300620 with translation.

(Continued)

*Primary Examiner*—Huy D. Vu
*Assistant Examiner*—Chuong Ho
(74) *Attorney, Agent, or Firm*—Katten Muchin Rosenman LLP

(57) ABSTRACT

A method for controlling switching in a bidirectional line-switched ring network configured by a plurality of optical fibers and a plurality of nodes, (i) having a first node receive as input an LP-S (or having the first node detect an SF-P) and having a second node adjacent to the first node across a span receive the LP-S (or receive the SF-P), and (ii) having the second node send an SF-R switch request to another node when the second node further detects an SF-R on said span under the above state (i), whereby a method for controlling switching in a bidirectional line-switched ring under conditions where ring switch and LP-S cannot co-exist, but ring switch and SF-P can, is realized, as a whole, in the ring network.

1 Claim, 27 Drawing Sheets

U.S. PATENT DOCUMENTS

| | | | |
|---|---|---|---|
| 6,430,700 B1 * | 8/2002 | Daruwalla et al. | 714/4 |
| 6,456,587 B2 * | 9/2002 | Taniguchi | 370/216 |
| 6,615,362 B1 * | 9/2003 | Daruwalla et al. | 714/4 |
| 6,625,115 B1 * | 9/2003 | Ikeda et al. | 370/217 |
| 6,643,041 B1 * | 11/2003 | Ikeda et al. | 398/79 |
| 6,735,171 B2 * | 5/2004 | Takeguchi | 370/235 |
| 6,820,210 B1 * | 11/2004 | Daruwalla et al. | 714/4 |
| 2002/0009091 A1 * | 1/2002 | Taniguchi | 370/403 |

FOREIGN PATENT DOCUMENTS

| | | |
|---|---|---|
| JP | 09-18419 | 1/1997 |
| JP | 2000-69067 | 3/2000 |
| JP | 2000-134244 | 5/2000 |

OTHER PUBLICATIONS

Notice of Reasons for Rejection dated Sep. 13, 2005 from corresponding Japanese Application 2000-300620 with translation.

* cited by examiner

Fig.13

| K1Byte | K2Byte | MEANING |
|---|---|---|
| Bit1-4 | Bit6-8 | |
| SF-P(LP-S) | 100 | LP-S(Idle) |
| SF-P(LP-S) | 101 | LP-S (STATE EXCEPT FOR Idle) |
| SF-P(LP-S) | EXCEPT FOR 100,101 | SF-P (INTERPRET AS MEANING OF K2 Byte Bit6-8 DEFINED BY GR1230-CORE) |

Fig.18

| SWITCH REQUEST | | |
|---|---|---|
| BIT 1 ∫ BIT 4 | BIT | PRIORITY LEVELS |
| | 1111 | Lockout of Protection (span) [LP-S] or Signal Fail (protection) [SF-P] |
| | 1110 | Forced Switch (span) [FS-S] |
| | 1101 | Forced Switch (ring) [FS-R] |
| | 1100 | Signal Fail (span) [SF-S] |
| | 1011 | Signal Fail (ring) [SF-R] |
| | 1010 | Signal Degrade (protection) [SD-P] |
| | 1001 | Signal Degrade (span) [SD-S] |
| | 1000 | Signal Degrade (ring) [SD-R] |
| | 0111 | Manual Switch (span) [MS-S] |
| | 0110 | Manual Switch (ring) [MS-R] |
| | 0101 | Wait To Restore [WTR] |
| | 0100 | Exerciser (span) [EXER-S] |
| | 0011 | Exerciser (ring) [EXER-R] |
| | 0010 | Reverse Request (span)[b] [RR-S] |
| | 0001 | Reverse Request (ring)[b] [RR-R] |
| | 0000 | No Request [NR] |

Fig.19

| SYMBOL | K1Byte | | K2Byte | | |
|---|---|---|---|---|---|
| | Bit(1-4) | Bit(5-8) | Bit(1-4) | Bit(5) | Bit(6-8) |
| a1 | NR | B | A | short | Idle |
| a2 | NR | F | A | short | Idle |
| a3 | SF-P(LP-S) | F | A | long | Idle |
| a4 | SF-P(LP-S) | F | A | short | RDI |
| a5 | LP-S(SF-P) | F | A | long | Idle |
| a6 | LP-S(SF-P) | F | A | short | Idle |
| a11 | LP-S(SF-P) | F | A | long | Idle |
| a12 | LP-S(SF-P) | F | A | short | Idle |
| a13 | SF-P(LP-S) | F | A | long | Idle |
| a14 | SF-P(LP-S) | F | A | short | RDI |
| a15 | SF-R | F | A | long | Br&Sw |
| a16 | SF-P(LP-S) | F | A | short | Br&Sw |
| a31 | SF-R | F | A | long | Idle |
| a32 | SF-P(LP-S) | F | A | short | RDI |
| a33 | SF-R | A | F | long | Br&Sw |
| a34 | SF-P(LP-S) | A | F | short | RDI |
| a41 | SF-R | F | A | long | Idle |
| a42 | SF-P(LP-S) | F | A | short | RDI |
| a43 | SF-R | F | A | long | Br&Sw |
| a44 | SF-P(LP-S) | F | A | short | RDI |
| a45 | LP-S(SF-P) | F | A | long | Idle |
| a46 | LP-S(SF-P) | F | A | short | RDI |
| b1 | NR | C | B | short | Idle |
| b2 | NR | A | B | short | Idle |
| c1 | NR | D | C | short | Idle |
| c2 | NR | B | C | short | Idle |
| d1 | NR | E | D | short | Idle |
| d2 | NR | C | D | short | Idle |

Fig.20

| SYMBOL | K1Byte | | K2Byte | | |
|---|---|---|---|---|---|
| | Bit(1-4) | Bit(5-8) | Bit(1-4) | Bit(5) | Bit(6-8) |
| e1 | NR | F | E | short | Idle |
| e2 | NR | D | E | short | Idle |
| f1 | NR | A | F | short | Idle |
| f2 | NR | E | F | short | Idle |
| f3 | RR-S | A | F | short | Idle |
| f4 | LP-S(SF-P) | A | F | long | Idle |
| f11 | RR-S | A | F | short | Idle |
| f12 | SF-P(LP-S) | A | F | long | Idle |
| f13 | SF-R | A | F | short | RDI |
| f14 | SF-R | A | F | long | Idle |
| f15 | SF-R | A | F | short | RDI |
| f16 | SF-R | A | F | long | Br&Sw |
| f31 | SF-R | A | F | short | RDI |
| f32 | SF-R | A | F | long | Br&Sw |
| f41 | SF-R | A | F | short | RDI |
| f42 | SF-R | A | F | long | Br&Sw |
| f43 | SF-R | A | F | short | RDI |
| f44 | SF-R | A | F | long | Idle |
| f51 | EXER-R | A | F | short | RDI |
| f52 | EXER-R | A | F | long | Idle |

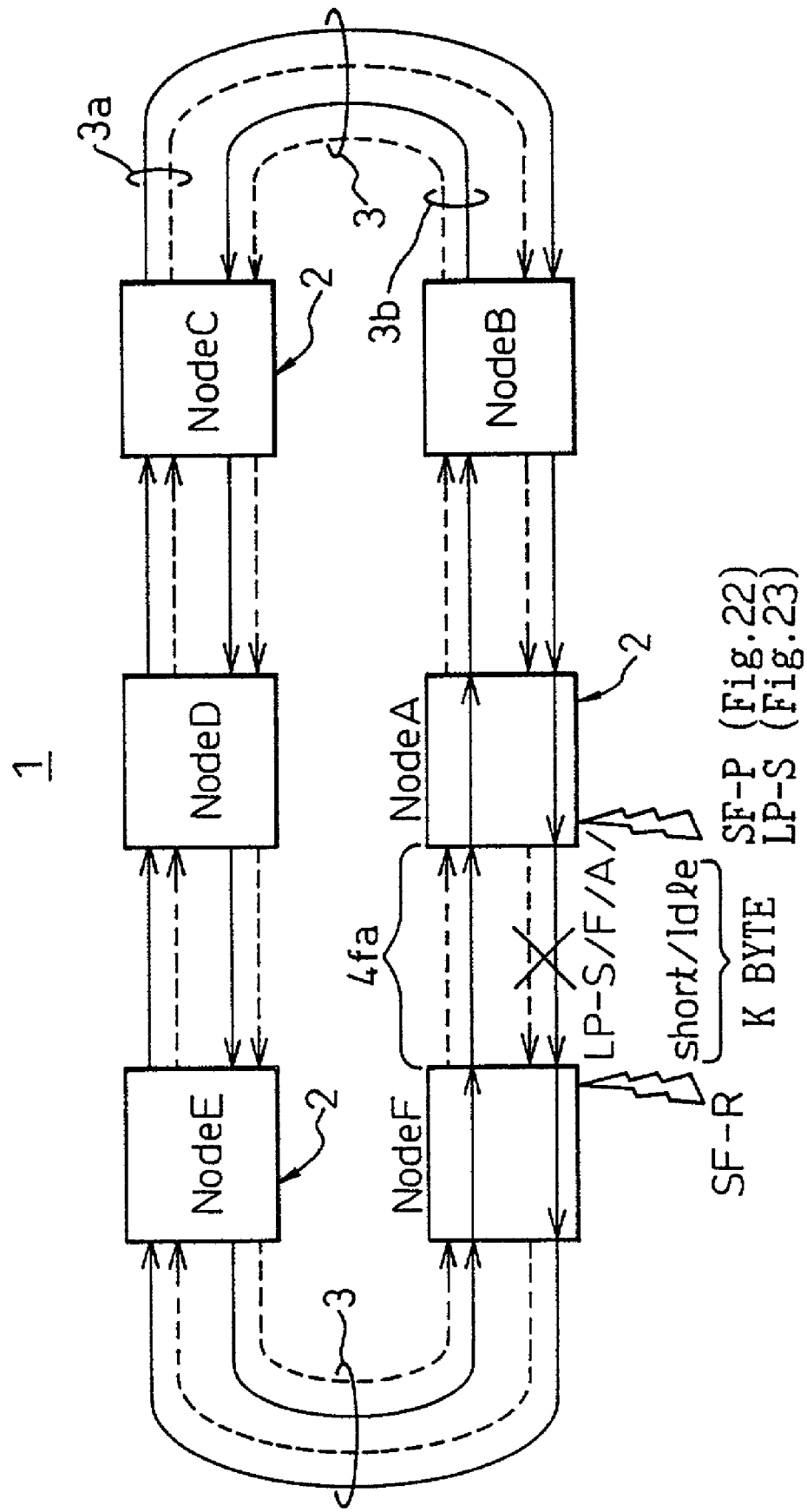

METHOD FOR CONTROLLING SWITCHING IN BIDIRECTIONAL LINE-SWITCHED RING

BACKGROUND OF THE INVENTION

1. Field of the Invention

The present invention relates to a method for controlling switching in a bidirectional line-switched ring (BLSR), more particularly relates to a method for controlling switching in a bidirectional line-switched ring which can be applied to a bidirectional line-switched ring network having a four-fiber configuration of the North American SONET standard.

The method for controlling switching in a bidirectional line-switched ring (BLSR) of SONET is realized by SONET Standard GR-1230-CORE Issue 4. In this method, there are two modes for switching in a ring network: ring switch and span switch. To restore a span in which a failure occurs, use is made of a protection channel in the ring network in both the cases of ring switch and span switch.

In this case, the switching is executed between two adjacent nodes connected to the two sides of the span to be switched.

In the BLSR switching control method, information concerning the switching is transferred to nodes of the ring network by utilizing the K1 and K2 bytes in a section overhead (SOH). The method for utilizing these K1 and K2 bytes (K bytes) is defined in SONET Standard GR-1230-CORE Issue 4.

2. Description of the Related Art

The present invention deals with the problems occurring due to the fact that ring switch can co-exist with another switch request on an identical span. As one means for dealing with these problems, there is for example the technique disclosed in Japanese Unexamined Patent Publication (Kokai) No. 9-18419. Japanese Unexamined Patent Publication (Kokai) No. 9-18419, however, alludes to the problem occurring when releasing ring switch when ring switch and an LP-S co-exist and differs from the present invention.

Namely, the present invention deals with the problems arising where ring switch and an LP-S cannot co-exist, but ring switching and SF-P can.

Specifically, the present invention deals with problems arising on the same side (span side) of each node where:

(i) LP-S and ring switch by a command (FS-R, MS-R, and EXER-R) cannot be executed, and (ii) LP-S and ring switch due to channel failure (SF-R, SD-R) cannot be executed, but (iii) SF-P and ring switch by a command (FS-R, MS-R, and EXER-R) are executed, or (iv) SF-P and ring switch due to channel failure (SF-R, SD-R) are executed.

When dealing with this situation, three problems arise. These problems will be explained in detail later by referring to the drawings, but in brief are as follows:

The first problem is such a problem that the first 4 bits of the K1 byte indicating a switch request are "1111" in both the LP-S and SF-P, so these cannot be differentiated. In some cases, even if there is a request for ring switch on the identical span, the ring switch cannot be executed.

The second problem is that during the execution of LP-S, the user receiving special communication service (protection channel access: PCA) can no longer use a protection channel in use for the PCA.

The third problem is that if there is a change in a switch request after an LP-S or SF-P switch request, the change cannot be quickly followed up on.

SUMMARY OF THE INVENTION

An object of the present invention is to provide a method for controlling switching in a bidirectional line-switched ring capable of solving these three problems.

To attain the above object, the present invention provides a method for controlling switching in a bidirectional line-switched ring network (1) configured by a plurality of optical fibers (3) and a plurality of nodes (2), (i) having a first node receive as input an LP-S (or having the first node detect an SF-P) and having a second node adjacent to the first node across a span receive the LP-S (or receive the SF-P), and (ii) having the second node send an SF-R switch request to another node when the second node further detects an SF-R on said span. By this, a method for controlling switching in a bidirectional line-switched ring under conditions where ring switch and LP-S cannot co-exist, but ring switch and SF-P can, is realized, as a whole, in the ring network.

BRIEF DESCRIPTION OF THE DRAWINGS

The above object and features of the present invention will be more apparent from the following description of the preferred embodiments given with reference to the accompanying drawings, wherein:

FIG. 13 is a view of an example of identifying LP-S and SF-P by utilizing a K2 byte;

FIG. 18 is a list of specific examples of switch requests;

FIG. 19 is a first part of a list of meanings of all symbols (a1, a2, ..., f52) appearing in the sequence diagrams;

FIG. 20 is a second part of a list of meanings of all symbols (a1, a2, . . . , f52) appearing in the sequence diagrams;

FIG. 21 is a view of a ring network in a case where the node receiving the K bytes operates by interpreting that it received LP-S;

DESCRIPTION OF THE PREFERRED EMBODIMENTS

Before describing the embodiments of the present invention, the related art and the disadvantages therein will be described with reference to the related figures.

Figure 14:
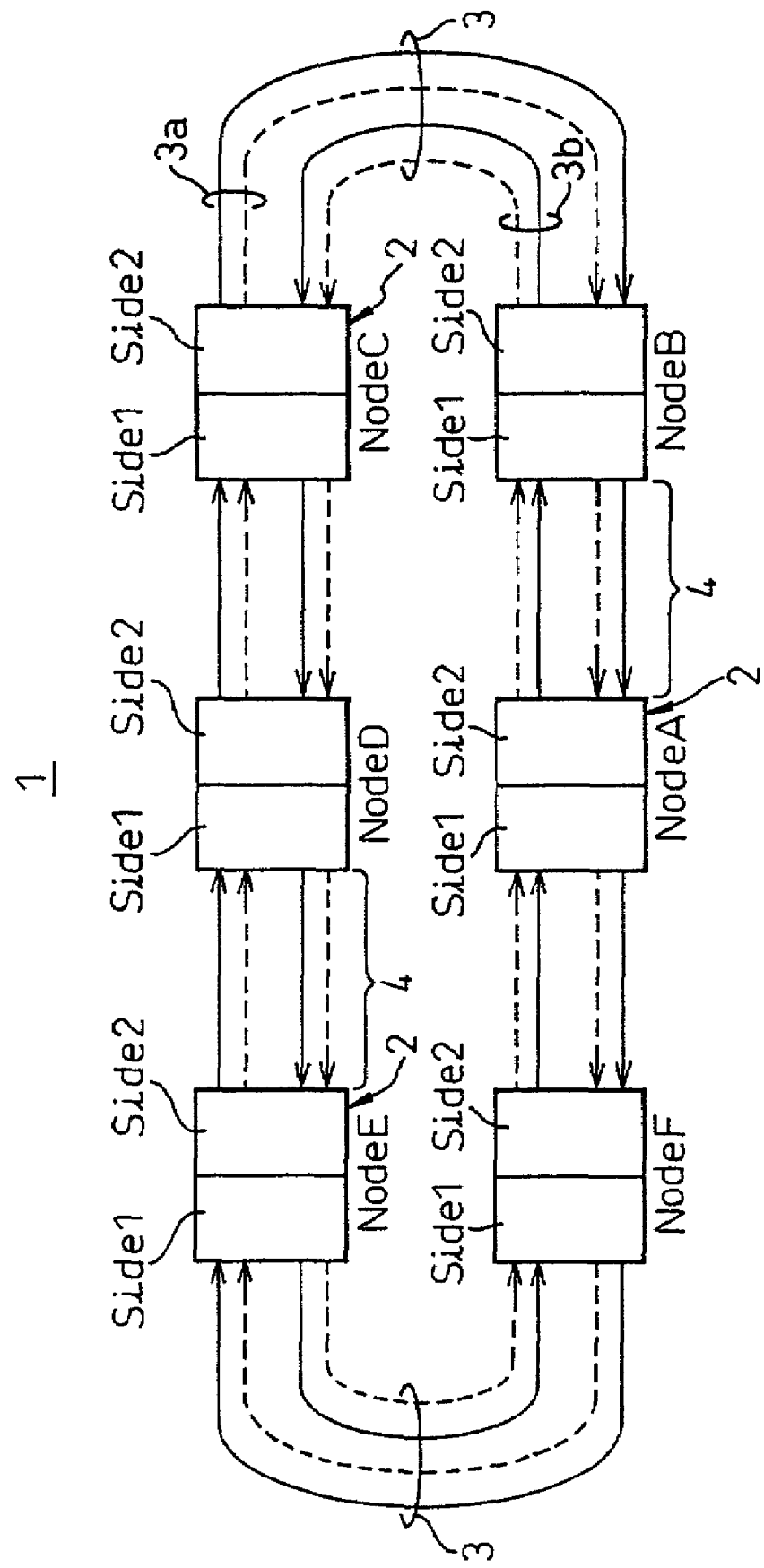
FIG. 14 is a view of the configuration of a general bidirectional line-switched ring network.

FIG. 14 is a view of the configuration of a general bidirectional line-switched ring network.

In the figure, reference numeral 1 denotes a bidirectional line-switched ring network. This network 1 is configured by for example six nodes 2 (A to F) and a plurality of optical fibers 3 connecting adjacent nodes among these nodes and forming a ring-like transmission line as a whole.

The plurality of optical fibers 3 include first optical fibers 3a over which signals flow in a clockwise direction and second optical fibers 3b over which signals flow in a counterclockwise direction. Four optical fibers 3 in total are shown in the figure.

The first optical fibers 3a and the second optical fibers 3b each include a working channel represented by a solid line and a protection channel represented by a broken line. The section between two adjacent nodes connected by these working and protection channels is called a "span" (shown by reference numeral 4 in the figure). Each node 2 is connected to adjoining nodes at a Side 1 and Side 2 through the corresponding spans 4.

The protection channels are used to restore service when a failure occurs on a working channel and communication over the related span becomes impossible. The method of restoration includes ring switch and span switch.

Figure 15:
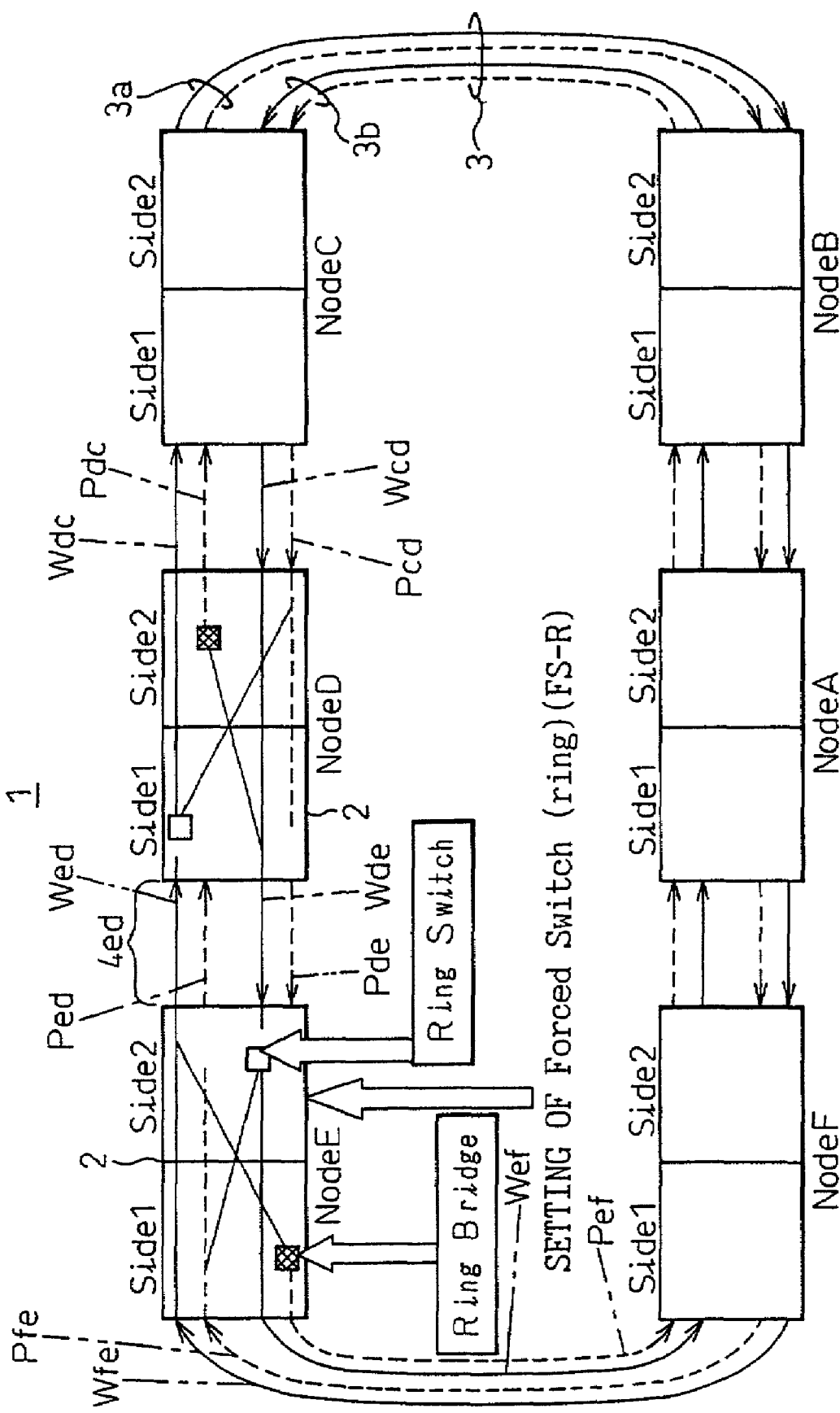
FIG. 15 is a view of the state of the nodes at the time of ring switch.

FIG. 15 is a view of the state of the nodes at the time of ring switch. Note that throughout all of the figures, the same reference numerals or symbols are attached to similar components.

In FIG. 15 in the same way as the case of FIG. 14, the network is comprised by six nodes 2, i.e., a node A to a node F. The figure shows a state where a failure occurs on for example a span 4 between the node E and the node D (shown as "4ed" in the figure) and ring switch is executed on this span 4ed. In the figure, an example is shown where this ring switch is executed by an operator setting an FS-R (forced switch (ring)) command, but sometimes ring switch is autonomously executed in the network 1 upon occurrence of failure.

The symbols Wed, Ped, . . . , etc. used in the figure mean as follows:

Wcd: Working channel from the node C to the node D
Pcd: Protection channel from the node C to the node D
Wdc: Working channel from the node D to the node C
Pdc: Protection channel from the node D to the node C
Wde: Working channel from the node D to the node E
Pde: Protection channel from the node D to the node E
Wed: Working channel from the node E to the node D
Ped: Protection channel from the node E to the node D
Wef: Working channel from the node E to the node F
Pef: Protection channel from the node E to the node F
Wfe: Working channel from the node F to the node E
Pfe: Protection channel from the node F to the node E Looking at the node E first, a signal flowing from the node F through the working channel Wfe is looped back in the node E to the opposite side protection channel Pef leading to the node F. This will be referred to as a "ring bridge". Further, the signal flowing over the protection channel Pfe from the node F is received at the node E side of the node E in place of the signal flowing over the working channel Wde. This will be referred to as "ring switch". Accordingly, ring switch is executed together with a ring bridge.

That is, at the node E, the signal flowing over the working channel Wed to the node D is looped back to the protection channel Pef to the node F, while the signal which had been received over the working channel of the node D is received from the protection channel Pfe.

On the other hand, the node D reads the FS-R from the K bytes of the signal received from the node E and autonomously executes switching in the same way as that of the case of the node E.

Namely, the signal flowing from the node C through the working channel Wcd is looped back in the node D to the opposite side protection channel Pdc leading to the node C (ring bridge described before). Further, the protection channel Pcd from the node C is connected to the working channel Wdc in the node D (ring switch described before).

Figure 16:
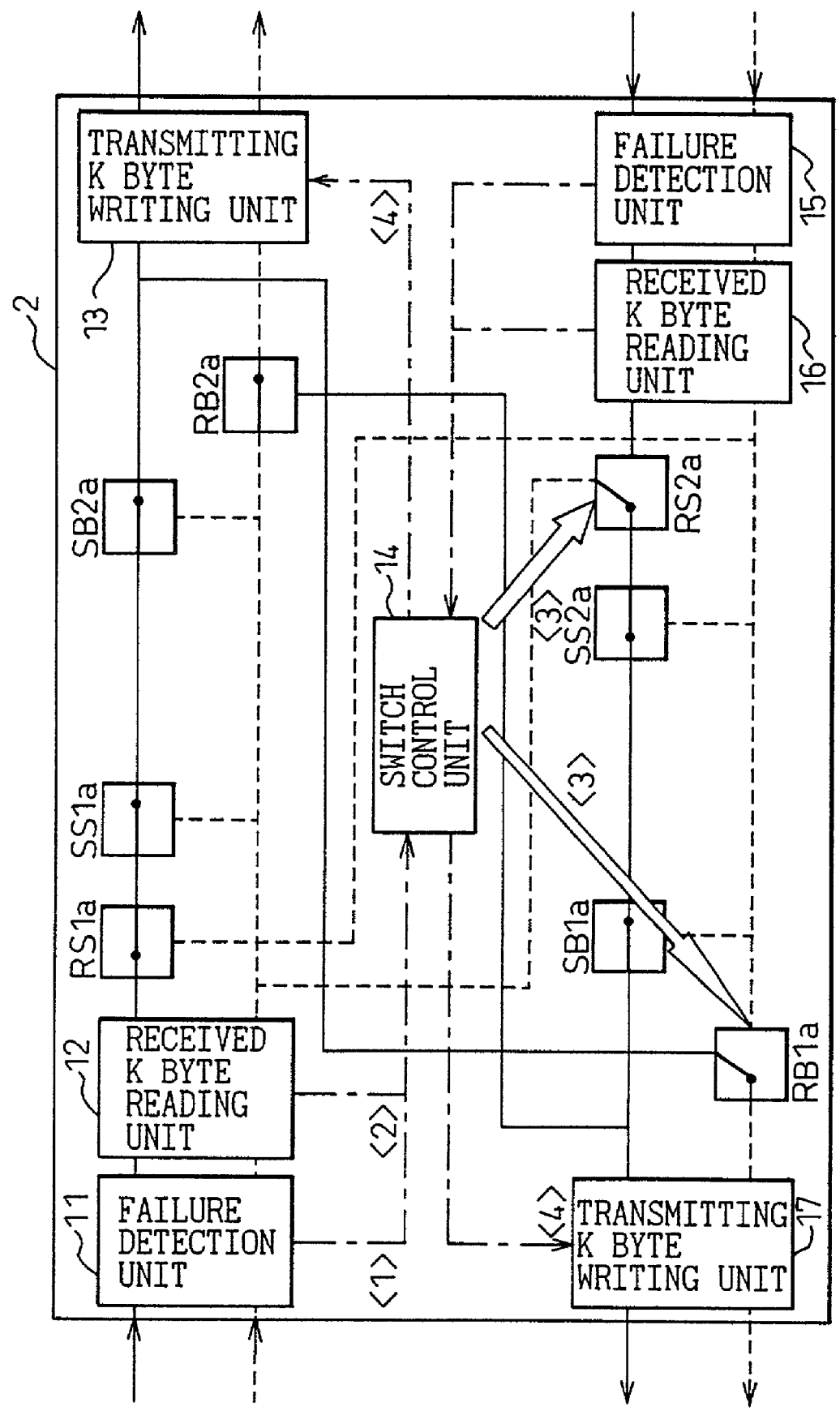
FIG. 16 is a block diagram of the configuration of a node.

FIG. 16 is a block diagram of the configuration in a node. Note that the figure shows one node as an example, but the other nodes have similar configurations.

In the figure, reference numerals 11 and 15 are failure detection units, 12 and 16 are received K byte reading units, 13 and 17 are transmitting K byte writing units, and 14 is a switch control unit. The other reference symbols in the figure, the positions at which they are placed, and their meanings are as follows:

RS1a . . . Side 1 . . . ring switch selector
RB1a . . . Side 1 . . . ring bridge selector
SS1a . . . Side 1 . . . span switch selector
SB1a . . . Side 1 . . . span bridge selector
RS2a . . . Side 2 . . . ring switch selector
RB2a . . . Side 2 . . . ring bridge selector
SS2a . . . Side 2 . . . span switch selector
SB2a . . . Side 2 . . . span bridge selector Further, <1>, <2>, <3>, and <4> in the figure show the routine for execution of ring switch.

When assuming that a channel failure occurs, this failure is detected at the failure detection unit 11 which then prompts the switch control unit 14 to perform switching <1>. Alternatively, the K bytes in a received signal are read by the received K byte reading unit 12 which then prompts the switch control unit 14 to perform switching <2>.

Responding to this, the switch control unit 14 controls the corresponding selectors RS2a and RB1a so as to realize the illustrated connection state. In this case, the case where only the selector RB1a is controlled will be referred to as a bridge state ("Ring Bridge" of FIG. 15), while the case where not only the selector RB1a, but also RS2a are controlled will be referred to as a bridge/switch state ("Ring Bridge"+"Ring Switch" of FIG. 15). Note that, a case of only the switching state does not exist.

When assuming that the failure detection unit 15 of FIG. 16 detects a certain channel failure, the switch control unit 14 writes an APS byte into the K bytes of the transmission signal at the transmitting K byte writing unit 17 to successively notify the other nodes of the failure. This is done in the form of a switch request.

Figure 17:
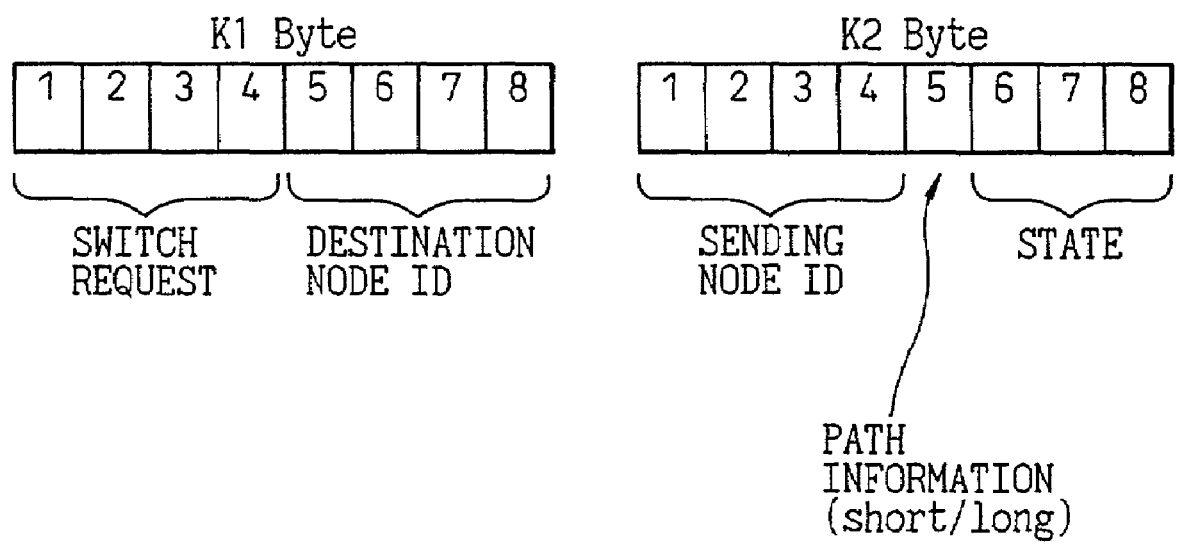
FIG. 17 is a view of the format of k bytes.

FIG. 17 is a view of the format of K bytes according to SONET.

The switch request is written into bit 1 to bit 4 in the K1 byte in the K1 byte+K2 byte comprising the K bytes. A destination node ID is written into bit 5 to bit 8 following this. In the example of FIG. 15, the ID of the node D is written.

On the other hand, in the K2 byte, a sending node ID is written in bit 1 to bit 4. In the example of FIG. 15, the ID of the node E is written. In the following bit 5, path information (short/long) is written. In FIG. 15, a path of node E→node D is short, and a path of node E → node F→ . . . →node C→node D is long. Also, in the following bit 6 to bit 8, the states of the sending node (idle, bridge, bridge & switch ("Ring Bridge"+"Ring Switch"), etc.) are written. The example of a switch request among them will be shown.

FIG. 18 is a list of specific examples of the switch request. This is according to SONET and is well known. In this list, LP-S and SF-P where bit 1 to bit 4=1111 are particularly relevant to the present invention.

The switch request information is as shown in the list. In this, LP-S and SF-P are indicated by the same code (1111). However, the meanings of LP-S and SF-P are different.

Namely, LP-S is a command input by the user and prohibits the execution of all ring switch in the ring network 1. On the other hand, SF-P indicates a case where the protection channel in question is in an SF (signal fail) state and does not prohibit the execution of all ring switch in the ring network 1.

Further, for switching usually executed in the ring network 1, one of the switch requests is determined according to the priority level of the switch request (refer to the list of FIG. 18).

However, as an exception to the case where one switch request is determined in this way, sometimes lower priority switch requests can simultaneously co-exist. For example, SF-P (signal fail (protection)) and ring switch (FS-R, SF-R, SD-R, MS-R, and EXER-R in the list) can co-exist on the identical span 4. Namely, ring switch can be executed. Note that, LP-S and ring switch can never co-exist in the ring network 1 in any case. At such a time, the ring switch is not executed.

The present invention deals with the aforementioned problems occurring due to the fact that ring switch can co-exist with another switch request on an identical span 4. As one means for dealing with these problems, there is for example the above-mentioned technique disclosed in Japanese Unexamined Patent Publication (Kokai) No. 9-18419. As explained above, however, Japanese Unexamined Patent Publication (Kokai) No. 9-18419, alludes to the problem occurring when releasing ring switch when ring switch and an LP-S co-exist and differs from the present invention.

Namely, the present invention deals with the problems arising when ring switch and LP-S cannot co-exist, but ring switch and SF-P can.

Specifically, the present invention deals with problems arising on the same side (span side) of each node where:

(i) LP-S and ring switch by a command (FS-R, MS-R, and EXER-R) cannot be executed, and (ii) LP-S and ring switch due to channel failure (SF-R, SD-R) cannot be executed, but (iii) SF-P and ring switch by a command (FS-R, MS-R, and EXER-R) are executed, or (iv) SF-P and ring switch due to channel failure (SF-R, SD-R) are executed.

In summary, in the APS byte (above K byte) protocol used for switching in a bidirectional line-switched ring (BLSR switching) between certain adjacent nodes (2) in a ring network 1, the first 4 bits of the K1 byte indicating the switch request are represented by the same bit expression of "1111" in both the LP-S and SF-P, so the LP-S and SF-P cannot be differentiated from the first 4 bits "1111" of the K1 byte. Therefore, how to judge these and further how to perform the switching are the subjects of the present invention.

In other words, where SF-P or LP-S and ring switch co-exist, while each node 2 must perform different operations for the cases of SF-P and LP-S, at this time, SF-P and LP-S are indicated by the identical code in the K bytes, so only the node which detects or receives as input SF-P or LP-S (for example the node E of FIG. 15) can determine which of SF-P or LP-S is specified. That is, the nodes other than this node E cannot perform correct switching.

Namely, a node detecting the existence of either of SF-P or LP-S in the K bytes of the received signal cannot differentiate between the SF-P and LP-S, so cannot determine whether or not to perform the ring switch.

Therefore, conventionally, when detecting (1111) of the K1 byte, the nodes other than the node E of the above example interpret (provisionally determine) that either of SF-P or LP-S was received to proceed with the further control. Below, an explanation will be given of a case where a node interprets the detected K1 byte as LP-S and a case where it interprets the detected K1 byte as SF-P by referring to sequence diagrams etc.

Figure 22:
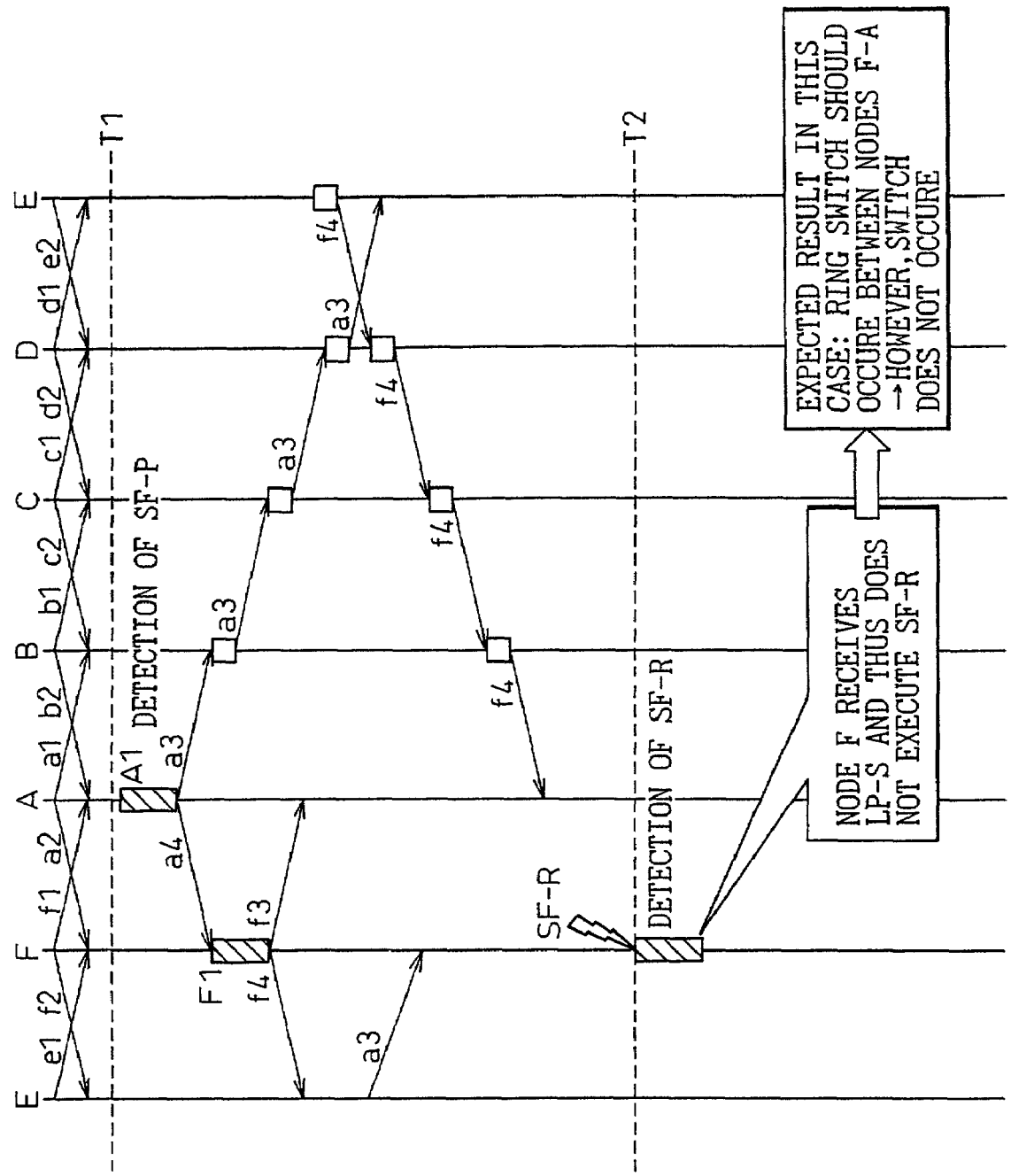
FIG. 22 is a first part of an operation sequence diagram in FIG. 21.
Figure 23:
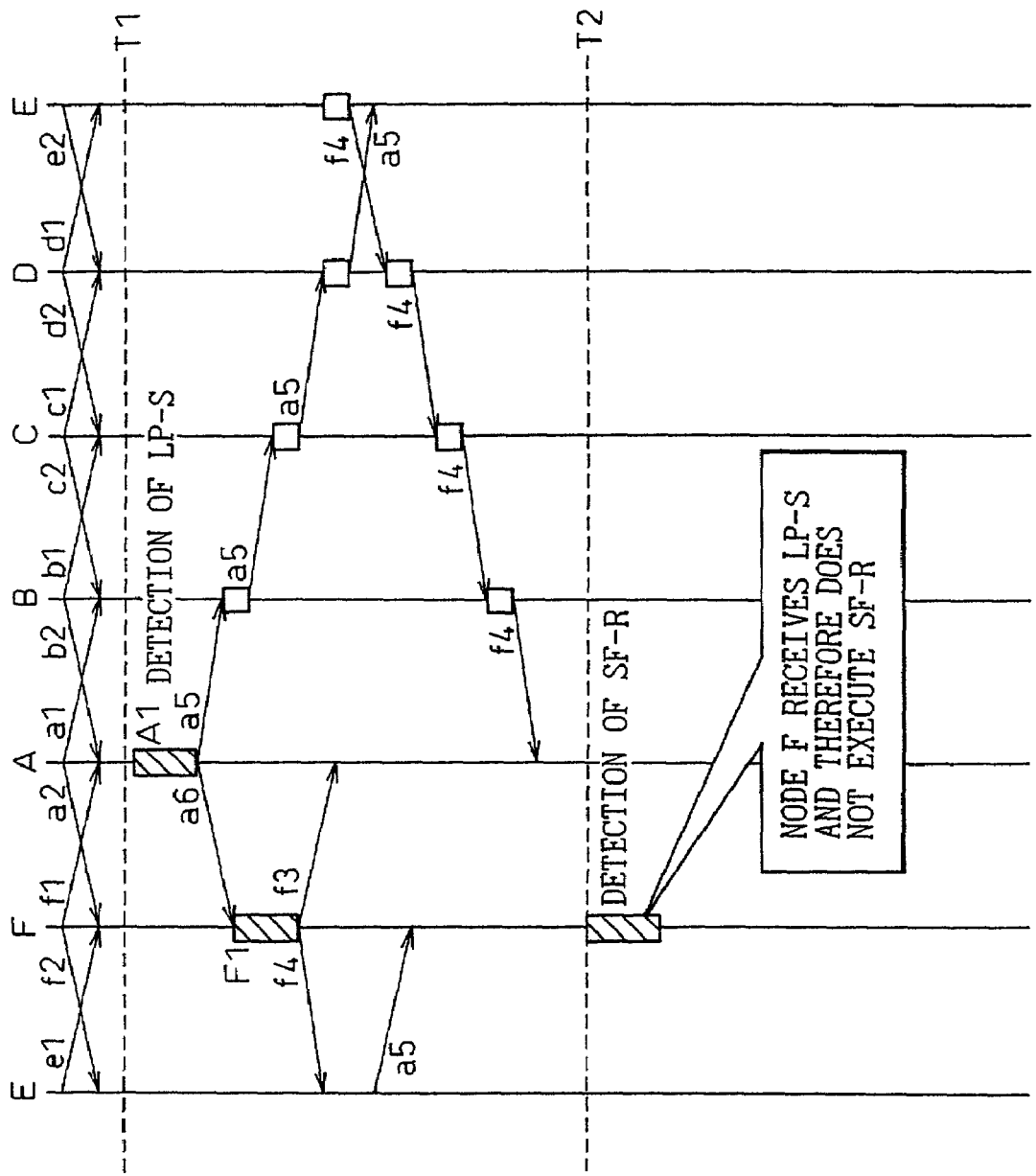
FIG. 23 is a second part of an operation sequence diagram in FIG. 21.

FIG. 19 and FIG. 20 are parts of a list of the meanings of all symbols (a1, a2, . . . , f52) appearing in the sequence diagrams. FIG. 21 is a view of a ring network in the case where a node receiving the K bytes interprets that it has received LP-S and operates under this interpretation. FIGS. 22 and 23 are parts of an operation sequence diagram in the case of FIG. 21.

Referring to FIG. 21 and FIG. 22, when assuming that a failure occurs in the protection channel of a second optical fiber 3b in a span 4fa, the node A detects SF-P at a time T1. The node A sends the first 4 bits "1111" of the K1 byte as a3 through the nodes B→C→D→E→F and simultaneously sends the same as a4 to the adjacent node F.

The node F receiving this a4 sends f3 to the adjacent node A and, at the same time, sends f4 through the nodes E→D→C→B→A.

Assume that the node F detects SF-R due to the channel failure from the node A at a time T2 after a while in such a state. Here, SF-P and SF-R co-exist.

In this case, even if the node F detects SF-R, the node F interprets the first 4 bits "1111" of the received K1 byte to indicate LP-S, so does not execute that SF-R.

In this case, the expected result is that ring switch occurs between the nodes F and A (span 4fa). However, the ring switch (SF-R) due to the failure is not executed. This is one problem.

Next, referring to FIG. 21 and FIG. 23, assume that the node A is set with LP-S at the time T1. The node A sends this LP-S as a5 of the first 4 bits "1111" of the K1 byte through the nodes B→C→D→E→F and simultaneously sends the same as a6 to the adjacent node F.

The node F receiving this a5 sends f3 to the node A and, at the same time, sends f4 through the nodes E→D→C→B→A.

Assume that the node F detects SF-R due to the channel failure from the node A at a time T2 after a while in such a state. Here, LP-S and SF-R co-exist.

In this case, when the node F detects that SF-R, the node F interprets the first 4 bits "1111" of the received K1 byte as the reception of LP-S, so does not execute that SF-R. This is the result as expected and is not a problem.

Next, an explanation will be made of the case where the first 4 bits "1111" of the K1 byte are interpreted as SF-P.

Figure 24:
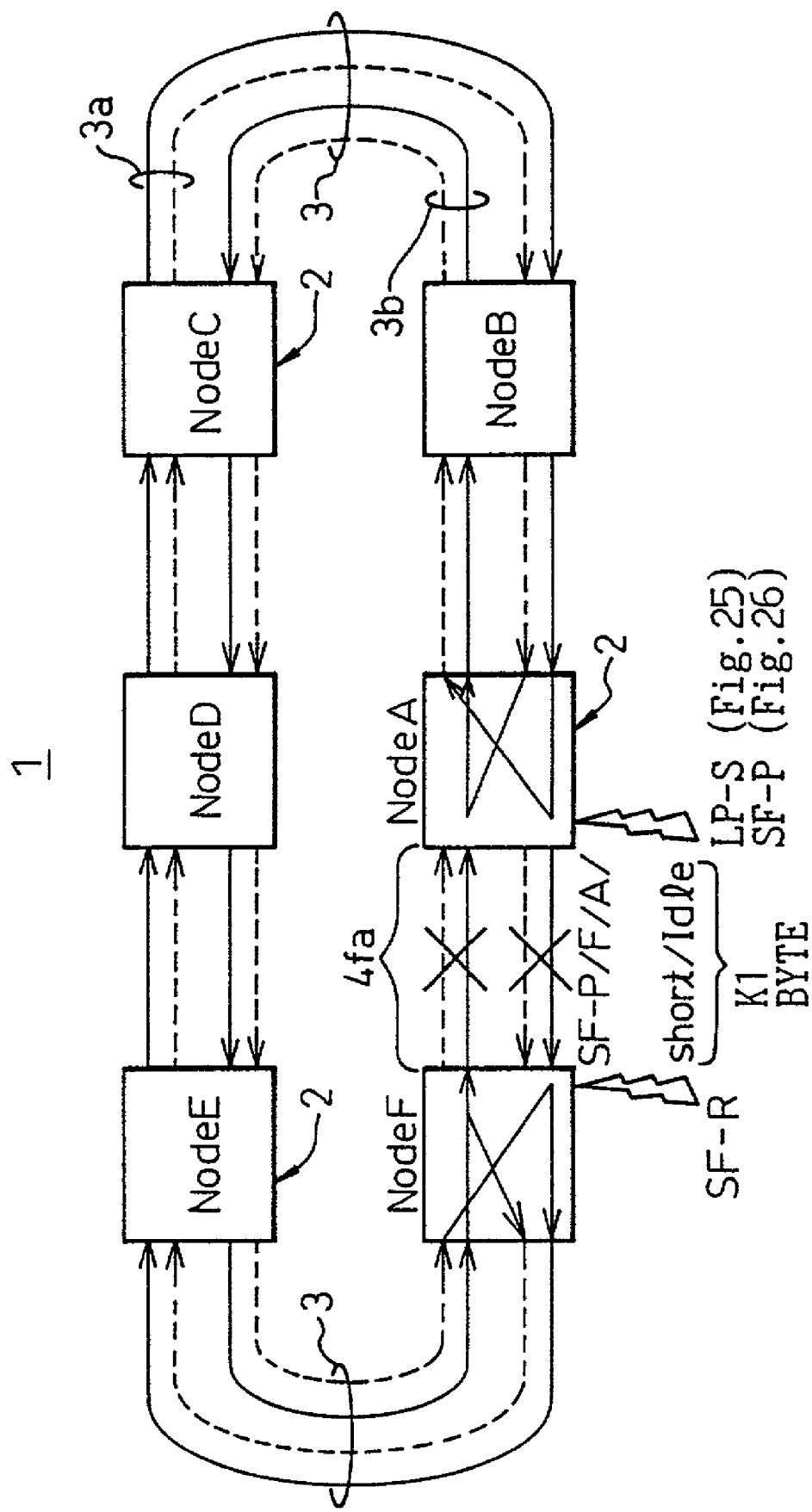
FIG. 24 is a view of a ring network in a case where the node receiving the K bytes operates by interpreting that it received SF-P.
Figure 25:
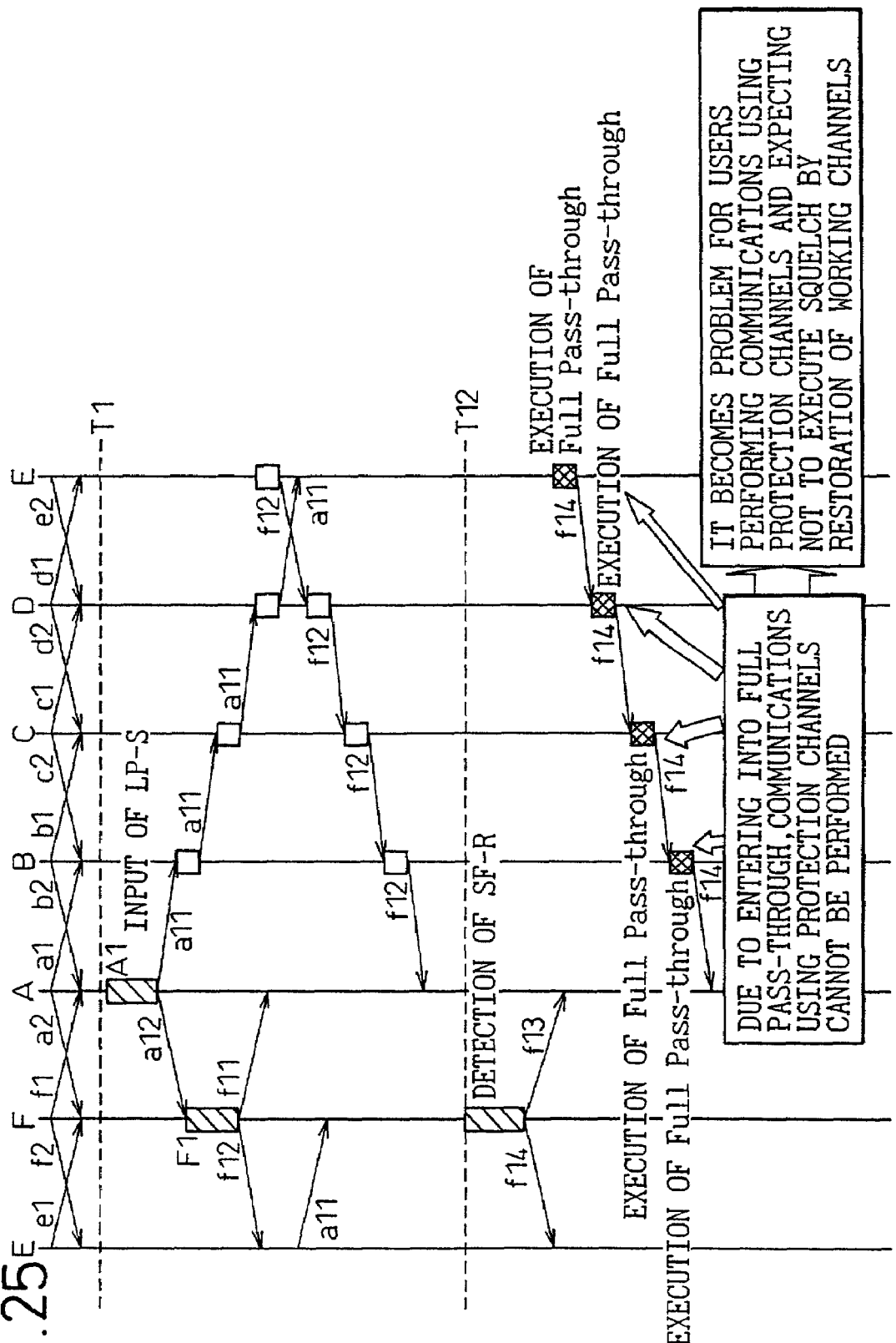
FIG. 25 is a first part of an operation sequence diagram in FIG. 24.
Figure 26:
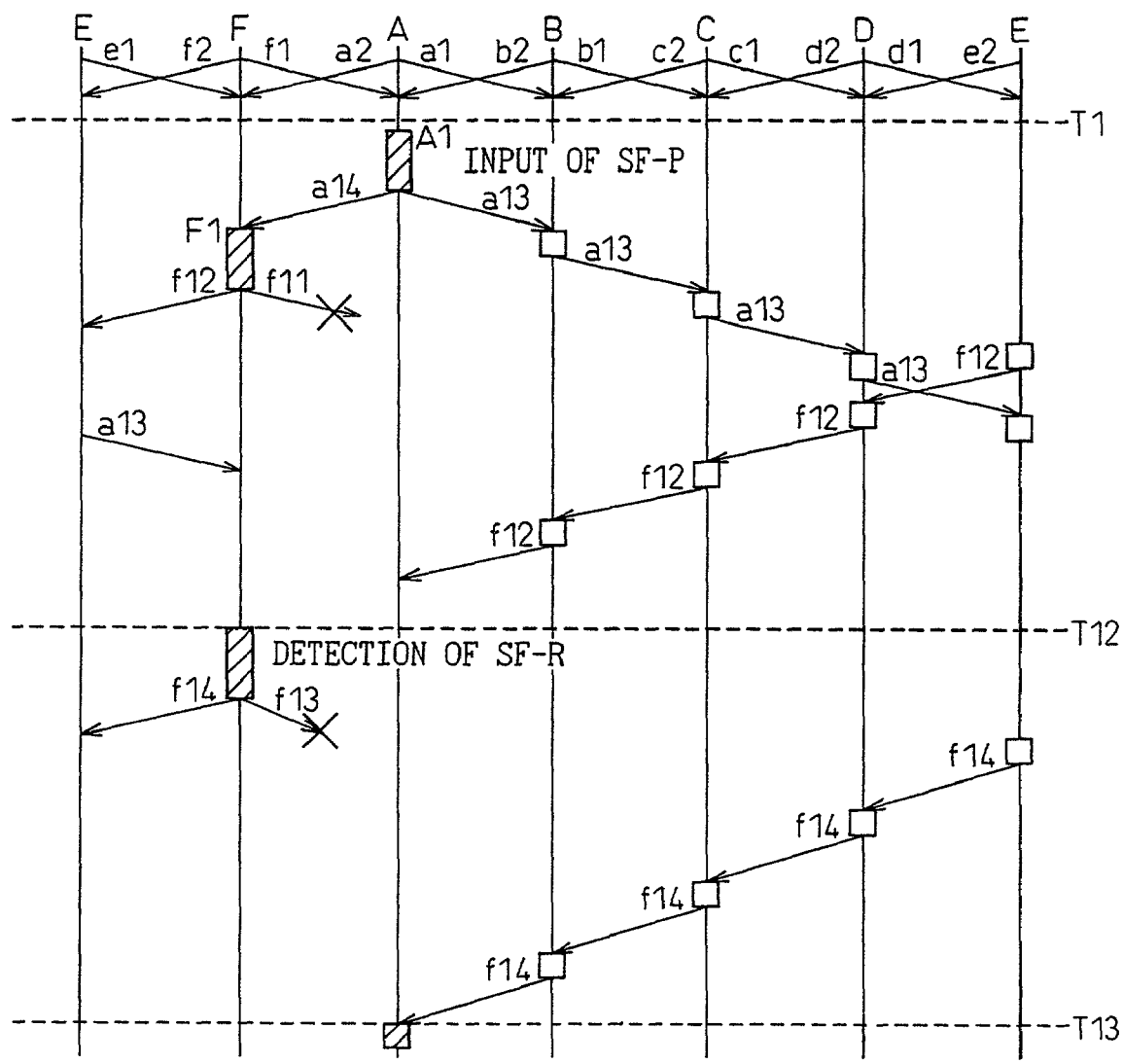
FIG. 26 is second part of an operation sequence diagram in FIG. 24.
Figure 27:
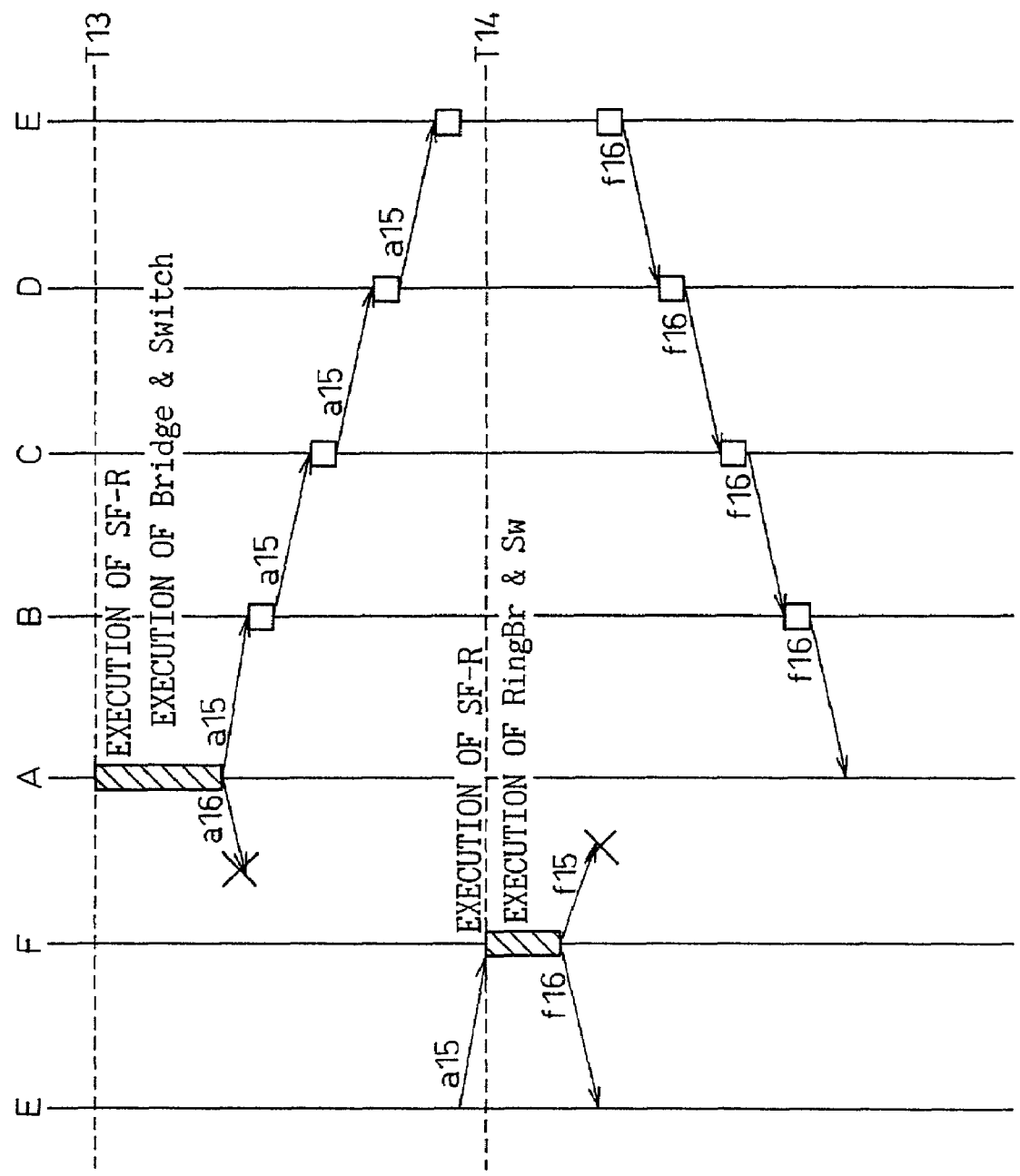
FIG. 27 is a third part of an operation sequence diagram in FIG. 24.

FIG. 24 is a view of a ring network in the case where the node receiving the K bytes interprets that it has received SF-P and operates under this interpretation. FIGS. 25 to 27 are parts of an operation sequence diagram in the case of FIG. 24.

Referring to FIG. 24 and FIG. 25, assume that the node A receives as input LP-S at the time T1. Under this assumption, the node A sends this as all through the nodes B→C→D→E→F and simultaneously sends the same as a12 to the adjacent node F.

The node F receiving this a12 sends f11 (RR-S) to the node A and, at the same time, sends f12 (LP-S) through the nodes E→D→C→B→A.

Assume that the node F detects SF-R from the channel from the node A at a time T12 after a while in such a state. Here, LP-S and SF-R co-exist.

The node F detecting SF-R sends this as f13 to the adjacent node A and, at the same time, sends f14 through the nodes E→D→C→B→A. Nodes receiving f14 (E, D, C, B) enter a full pass-through state.

In the full pass-through state, the protection channels (both of 3a and 3b) are used in addition to the use of the working channels to connect the spans at the two sides of the node concerned.

Note that SONET also defines a communications service using the protection channels (PCA: protection channel access). This is defined for effective utilization of the protection channels—usually not used for communication in the ring network. The state of use of PCA can still be maintained, even if failure occurs, by inputting an LP-S command. If ring switch is carried out, however, the problem arises that the connection of the protection channels provided for the communications service will be broken and that service will no longer be accessible, so the result will become different from expected.

Here, looking again at the full pass-through state mentioned above, the protection channels are also placed in the above connection state and incorporated into the ring network by the execution of the full pass-through state. For this reason, the above communications service will no longer be available. This therefore hinders users of the above communications service expecting not to be "squelched" by the restoration of working channels. This is another problem.

Next, an explanation will be made of another case by referring to FIG. 24, FIG. 26, and FIG. 27. Note that this case is one where a node operates assuming SF-P and the request is actually SF-P, so consequently no particular problem occurs.

When detecting that there is a failure in the protection channel over which a signal is received (SF-P) by a node A at the time T1, the node A sends a14 to the adjacent node F and simultaneously sends a13 through the nodes A→F.

Assume that after a while the node F detects SF-R at the time T12. Here, SF-P and SF-R co-exist.

The node F detecting this SF-R sends f13 through the short path toward the adjacent node A. Simultaneously, it sends f14 through the long path. When this reaches the node A at a time T13, the node A executes SF-R. Here, ring switch (Bridge & Switch) is executed. Along with this ring switch, the node A sends a16 through the short path toward the node F and sends a15 through the long path toward the node F. This a15 reaches the node F at the time T13, whereupon the node F executes the ring switch. Along with this, it sends f15 and f16 bidirectionally.

There is another problem in addition to the two problems explained above. If there is a change in a switch request after a switch request LP-S or SF-P (occurrence of switch request or restoration of service), the ring network as a whole must quickly follow up on that change so as to be ready for, even after that change, executing the switch promptly. However, conventionally, such a change not be followed up on. This is the other problem.

Accordingly, the present invention, first, solves the problem that the first 4 bits of the K1 byte indicating a switch request are "1111" in both the LP-S and SF-P, so these cannot be differentiated and, in some cases, even if there is a request for ring switch on the identical span, the ring switch cannot be executed; second, solves the problem that during the execution of LP-S, a user receiving special communication service (protection channel access: PCA) can no longer use a protection channel in use; and, third, solves the problem that if there is a change in a switch request after an LP-S or SF-P switch request, the change cannot be quickly followed up on.

In order to solve the above problems, the present invention makes the execution node executing LP-S or SF-P, an opposing node for the switching, and the other relay nodes linked to these execution node and opposing node in a ring operate differently from the related art to avoid the above problems in the ring network as a whole.

Namely, it enables discrimination of the difference between LP-S and SF-P. By this, it differentiates between and realizes (i) a first operation where LP-S and ring switch co-exist on the same span and (ii) a second operation where SF-P and ring switch co-exist on the same span.

As a result, ring switch does not occur during execution of LP-S, while ring switch is executed during SF-P. Thus, the desires of special communications service users who want to prohibit ring switch and the desires of users who want service to be reliably restored when failure occurs are simultaneously satisfied. This greatly improves the reliability of the ring network. Further, when there is a change in LP-S and SF-P, it is possible to follow up on the change and execute the switching in the ring network in real-time.

Figure 1:
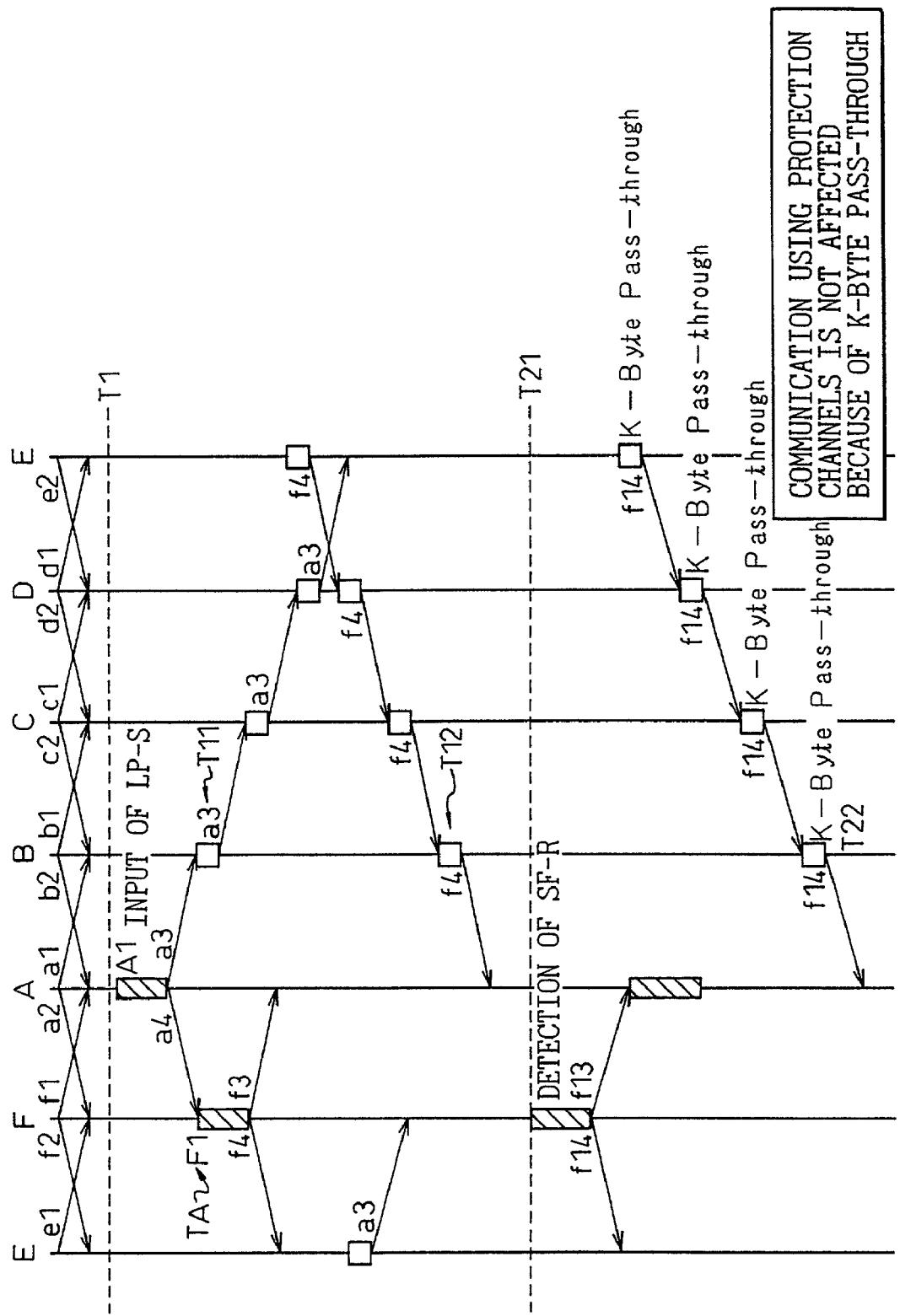
FIG. 1 is a sequence diagram of the method of the present invention in a case where LP-S and SF-R co-exist on an identical span.

FIG. 1 is a sequence diagram of the present invention where LP-S and SF-R co-exist in the identical span.

Assume that the LP-S is input to the node A at the time T1. The switch request indicated by the first 4 bits (1111) of the K1 byte is sent as a4 to the adjacent node F and sent as a3 through the nodes B→C→D→E→F. Note that the meanings of a3, a4, etc. are shown in FIG. 19 and FIG. 20.

The node F starts to transmit f4, that is, the switch request indicated by the first 4 bits "1111" of the K1 byte, upon receiving a4 from the node A. It transmits f3, that is, RR-S, to the adjacent node A.

The other relay nodes (B, C, D and E) existing on the long path between the node A and the node F receive the f4 and enter a K byte pass-through state based on the information of this f4. The K byte pass-through state is a state where only the received K bytes are copied and transmitted further on unlike a full pass-through state. Namely, no processing is carried out on a payload portion (main signal portion) in the signal.

Assume that a failure occurs in the working channel and the protection channel from the node A to the node F at a time T21 after a while and that the node F detects this failure (SF-R detection). Then, the node F starts to transmit SF-R as f13 to the adjacent node A and simultaneously starts to transmit it as f14 through the nodes E>D>C>B→A.

These relay nodes (E, D, C, and B) receive the f14 and maintain the K byte pass-through state based on the information of this f14. Due to the maintenance of this K byte pass-through state, there is no effect on the users of a communications service using the protection channels (PCA). This solves the aforementioned third problem.

As described above, the present invention is first characterized by providing a method for controlling switching in a bidirectional line-switched ring network configured by a plurality of optical fibers 3 and a plurality of nodes 2, (i) having a first node 2 (A) be set with an LP-S (lockout of protection (span)) command and having a second node 2 (F) adjacent to the first node 2 (A) receive the switch request from the first node 2 (A) through the optical fiber, and (ii) having the second node 2 (F) send a ring switch request to other nodes 2 (B, C, D, and E) when the second node 2 (F) detects a failure in the line over which it receives a signal from the first node 2 (A) under the above state (i).

Further, the present invention is characterized in that, when receiving a switch request having the highest priority level directed to the second node 2 (F) from the first node 2 (A), the relay nodes 2 (B, C, D and E) between the first node 2 (A) and the second node 2 (F) enter into the K byte pass-through state allowing only the K bytes to pass therethrough.

Furthermore, the present invention is characterized in that the relay nodes other than the two adjacent nodes connected to the two ends of the span to be switched enter the K byte pass-through state allowing only the K bytes to pass therethrough by a span switch request directed from one of the two adjacent nodes to the other and in that they maintain the K byte pass-through state when they receive a ring switch request directed from one of the two adjacent nodes to the other in that state.

Figure 2:
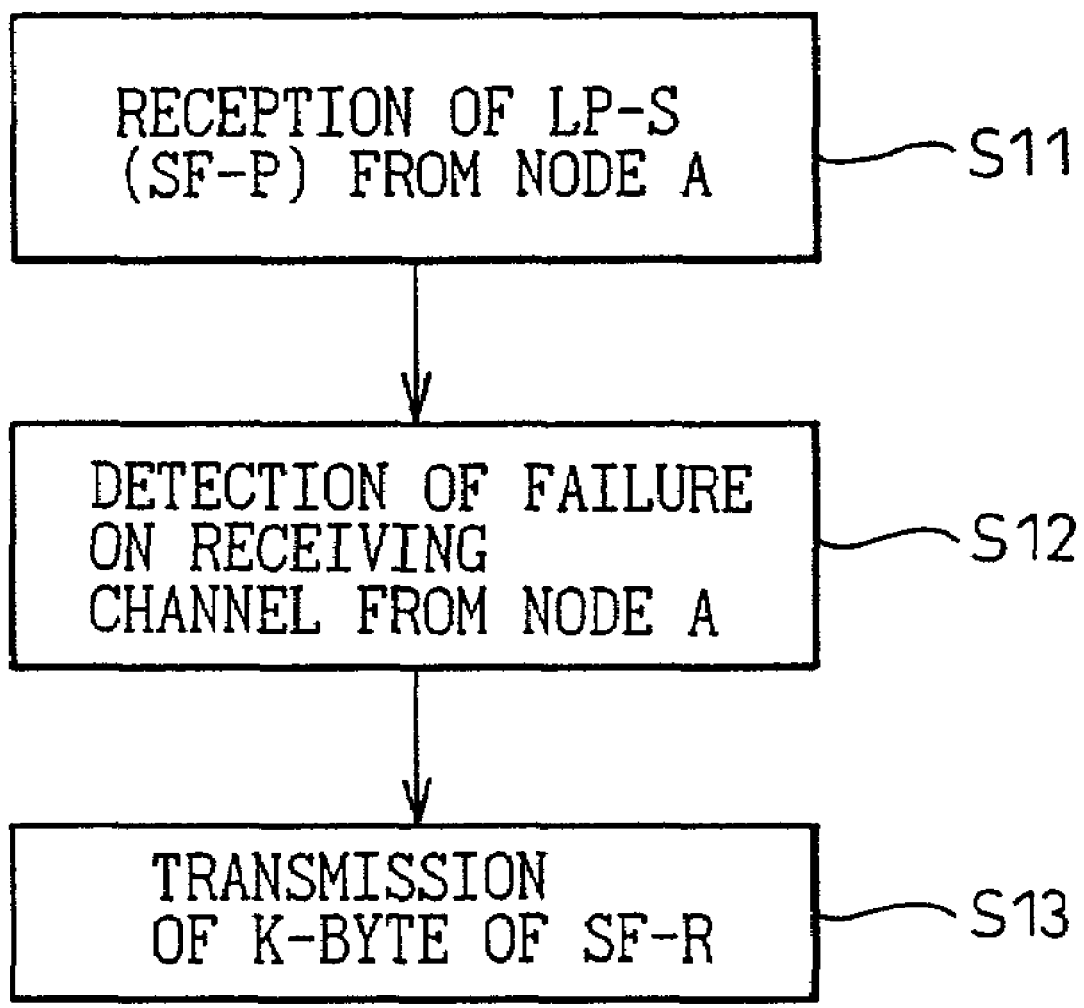
FIG. 2 is a flowchart of a switching operation performed at a node F of FIG. 1.
Figure 3:
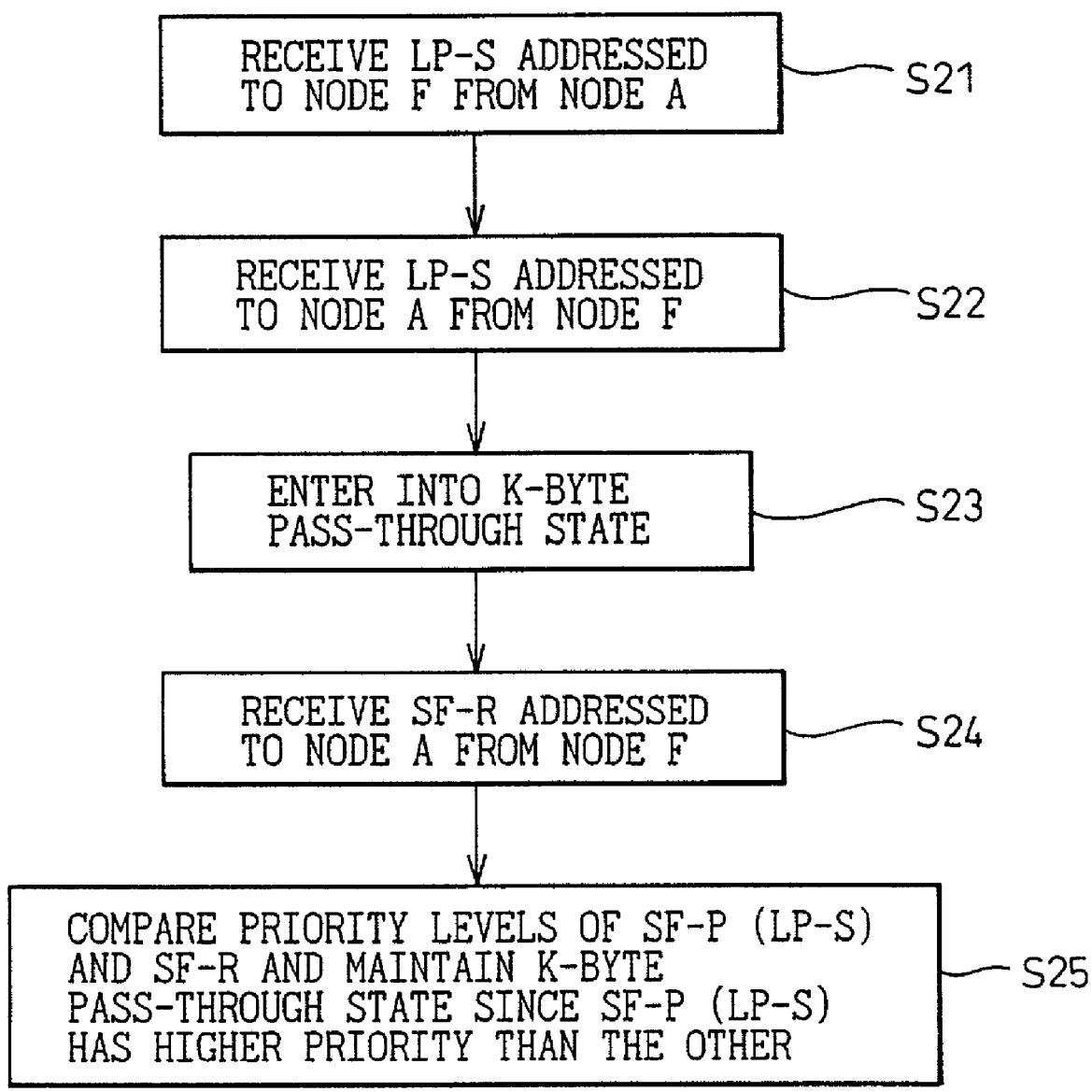
FIG. 3 is a flowchart of a switching operation performed at a node B of FIG. 1.

FIG. 2 is a flowchart of the switch operation at the node F of FIG. 1, and FIG. 3 is a flowchart of the switch operation at the node B of FIG. 1. Note that the node B is only one example. The same is true also for the nodes C, D, etc.

First, in FIG. 2,

Step S11: The node F receives LP-S (SF-P) (K byte=1111) from the node A (time TA).

Step S12: Thereafter, the node F detects a failure of the receiving channel from the node A (detects SF-R at the time T21).

Step S13: The node F writes SF-R in the K bytes of the transmission signal based on the SF-R detection and transmits the same to the other relay node.

As described above, the node F does not decide whether K byte=1111 is LP-S or SF-P, but provisionally transmits SF-R to the other nodes. Then, it formally determines LP-S or SF-P after waiting for a reaction from these other nodes. That is, the entire ring network including the relay nodes solves the problem.

An example of operation of switching control of the node B as a representative example of one of these relay nodes is shown in FIG. 3.

Step S21: The node B receives a3 (LP-S) directed to the node F from the node A (time T11).

Step S22: The node B receives f4 (LP-S) directed to the node A from the node F (time T12).

Step S23: By receiving the a3 and f4, the node B enters into a K byte pass-through state.

Step S24: The node B receives f14 (SF-R) directed to the node A from the node F after that (time T22).

Step S25: The node B compares the received SF-P (LP-S) and SF-R. In this case, SF-P (LP-S) has a higher priority level than SF-R (refer to FIG. 18), so the node B maintains the K byte pass-through state. Note that, conventionally, the node B enters into the full pass-through state at this time.

The above case is the case where LP-S and SF-R co-exist. The case where SF-P and SF-R co-exist will be explained next.

Figure 4:
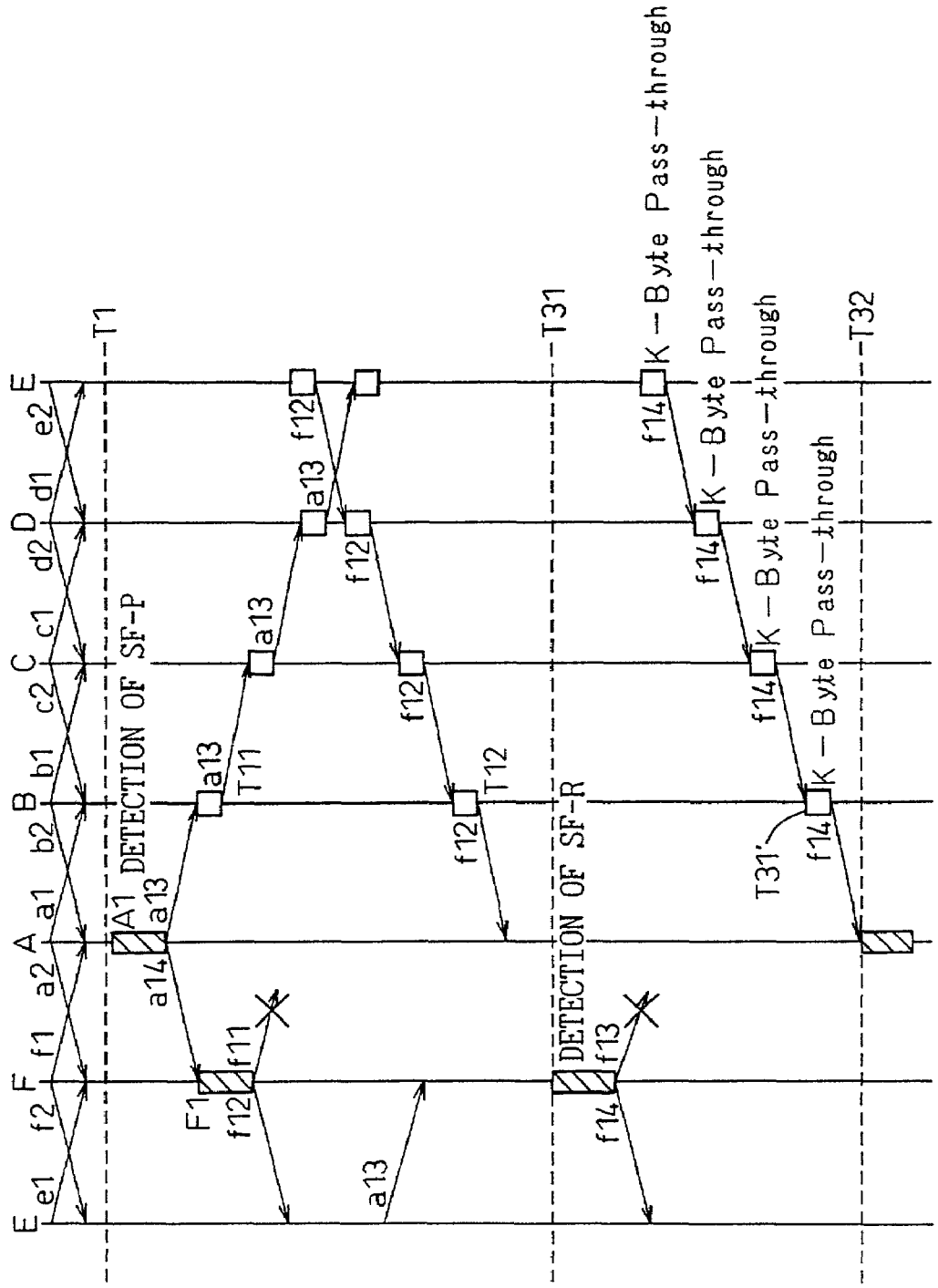
FIG. 4 is a first part of a sequence diagram of the method of the present invention in a case where SF-P and SF-R co-exist on an identical span.
Figure 5:
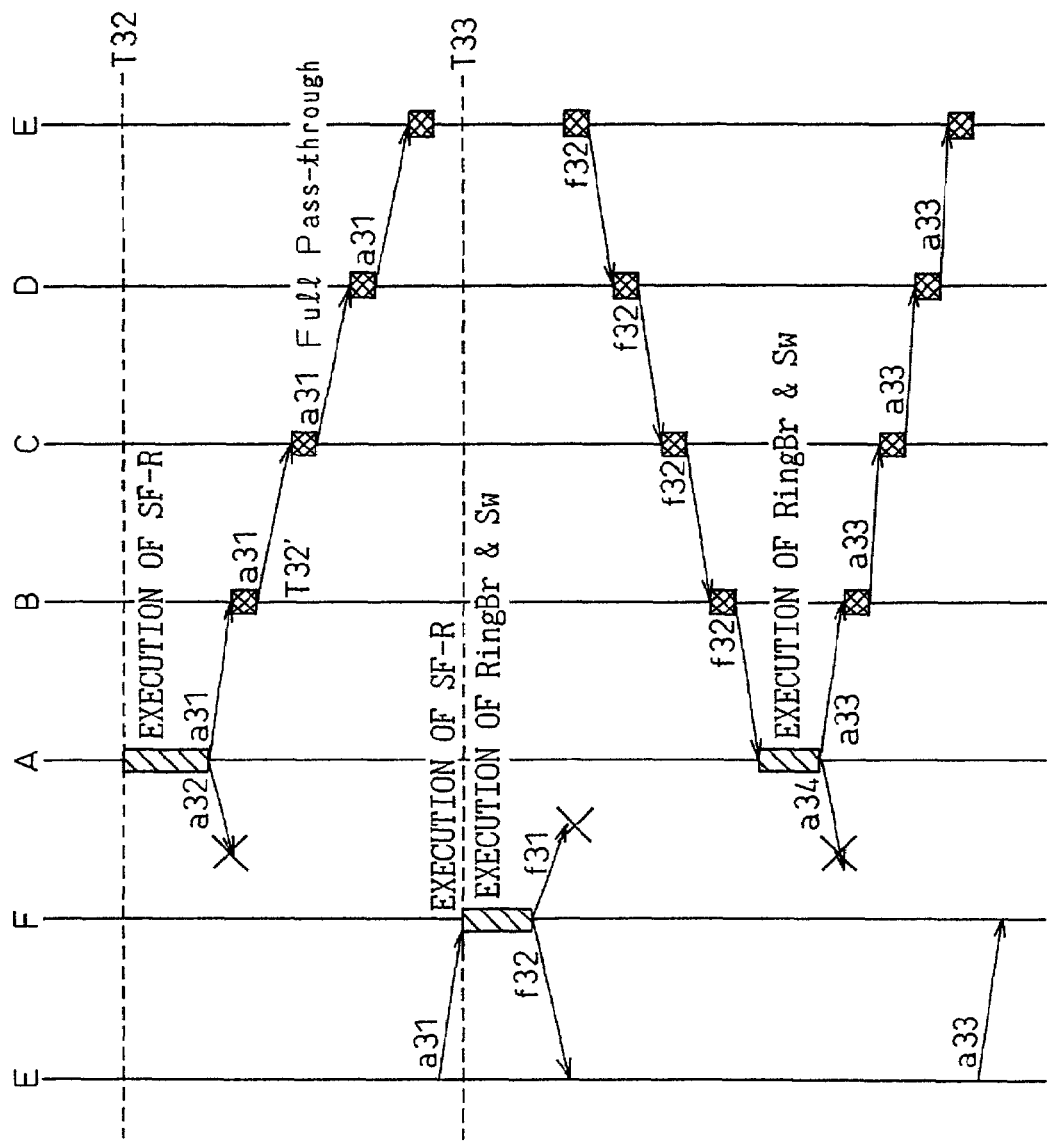
FIG. 5 is a second part of a sequence diagram of the method of the present invention in a case where SF-P and SF-R co-exist on an identical span.

FIGS. 4 and 5 are parts of a sequence diagram of the present invention where SF-P and SF-R co-exist in the identical span.

Referring to FIG. 4 first, assume that SF-P is detected at the node A due to failure of the receiving protection channel from the node F at the time T1. The node A executes this SF-P and, at the same time, sends the switch request of K1 byte "1111" as a14 to the adjacent node F and sends it as a13 through the nodes B→C→D→E→F. Note that the meanings of a13, a14, etc. are as shown in FIG. 19 and FIG. 20.

Upon receiving the switch request (a14) of K1 byte "1111" from the node A, the node F starts to transmit a switch request of the K1 byte "1111" (f12) as the response therefor. It transmits f11, that is, RR-S, to the adjacent node A.

The other relay nodes (B, C, D, and E) existing on the long path between the node A and the node F receive the f12 and enter the K byte pass-through state based on the information of this f12.

Assume that after a while, the node F detects SF-R at a time T31 due to the failure of the receiving working and protection channels from the node A (SF-R detection). Then, the node F executes that SF-R, starts to transmit this SF-R as f13 to the adjacent node A, and simultaneously starts to transmit the same also as f14 through the nodes E→D→C→B→A.

These relay nodes (E, D, C, and B) receive the f14 and maintain the K byte pass-through state according to the information of this f14. Due to the maintenance of this K byte pass-through state, there is no effect upon users of a communications service using the protection channels (PCA) (solution of the above-mentioned third problem).

As described above, the present invention is provides a method of controlling switching in bidirectional line-switched ring network 1 configured by a plurality of optical fibers 3 and a plurality of nodes 2, (i) having a first node 2 (A) detect a failure of a receiving protection channel from a second node and having the second node 2 (F) adjacent to this first node 2 (A) receive a switch request from the first node via the optical fibers, and (ii) having the second node 2 (F) transmit a ring switch request to other nodes when the second node 2 (F) detects the failure of the receiving channel from the first node under the above state (i).

Alternatively, the present invention is characterized in that, when receiving a switch request having the highest priority level directed to the second node 2 (F) from the first node 2 (A), the relay nodes 2 (B, C, D, and E) between the first node 2 (A) and the second node 2 (F) enter into the K byte pass-through state allowing only the K bytes to pass therethrough.

Further, the present invention is characterized in that the relay nodes other than the two adjacent nodes connected to the two ends of a span for switching enter the K byte pass-through state allowing only the K bytes to pass therethrough by a span switch request directed from one of the two adjacent nodes to the other and in that they maintain the K byte pass-through state when they receive a ring switch request directed from one of the two adjacent nodes to the other under the above entered K byte pass-through state.

Next, an explanation will be made of the processing after a time T32 of FIG. 4 by referring to FIG. 5.

At the time T32, the node A receives f14 from the node F through the long path (bottom end of FIG. 4). By this, the node A transmits SF-R as a31 onto the long path. It simultaneously transmits a32 to the adjacent node F.

Namely, when the other node 2 (A) has received LP-S or SF-P before that, the other node 2 (A) receiving the ring switch request from one node 2 (F) as one of two adjacent nodes connected to the two ends of the span to be switched only transmits the ring switch request corresponding to that ring switch request, does not execute the related ring switch, but maintains the idle state.

Note that, conventionally, a bridge & switch (ring switch) operation has been carried out without transmitting SF-R.

In the above case, by receiving the SF-R (a31), the relay nodes (B, C, D, and E) existing on the long path between the node A and the node F enter into the full pass-through state. Further, at a time T33, the node F receives the SF-R (a31) and executes a bridge & switch (ring Br & Sw in the figure) operation.

Along with this, the node F transmits f31 to the adjacent node A side and transmits f32 (Br & Sw) through the long path toward the node A.

The node A receiving this f32 executes the ring switch (Ring Br & Sw in the figure) at the node A. Further, the node A transmits a34 and a33 toward the node F.

Figure 6:
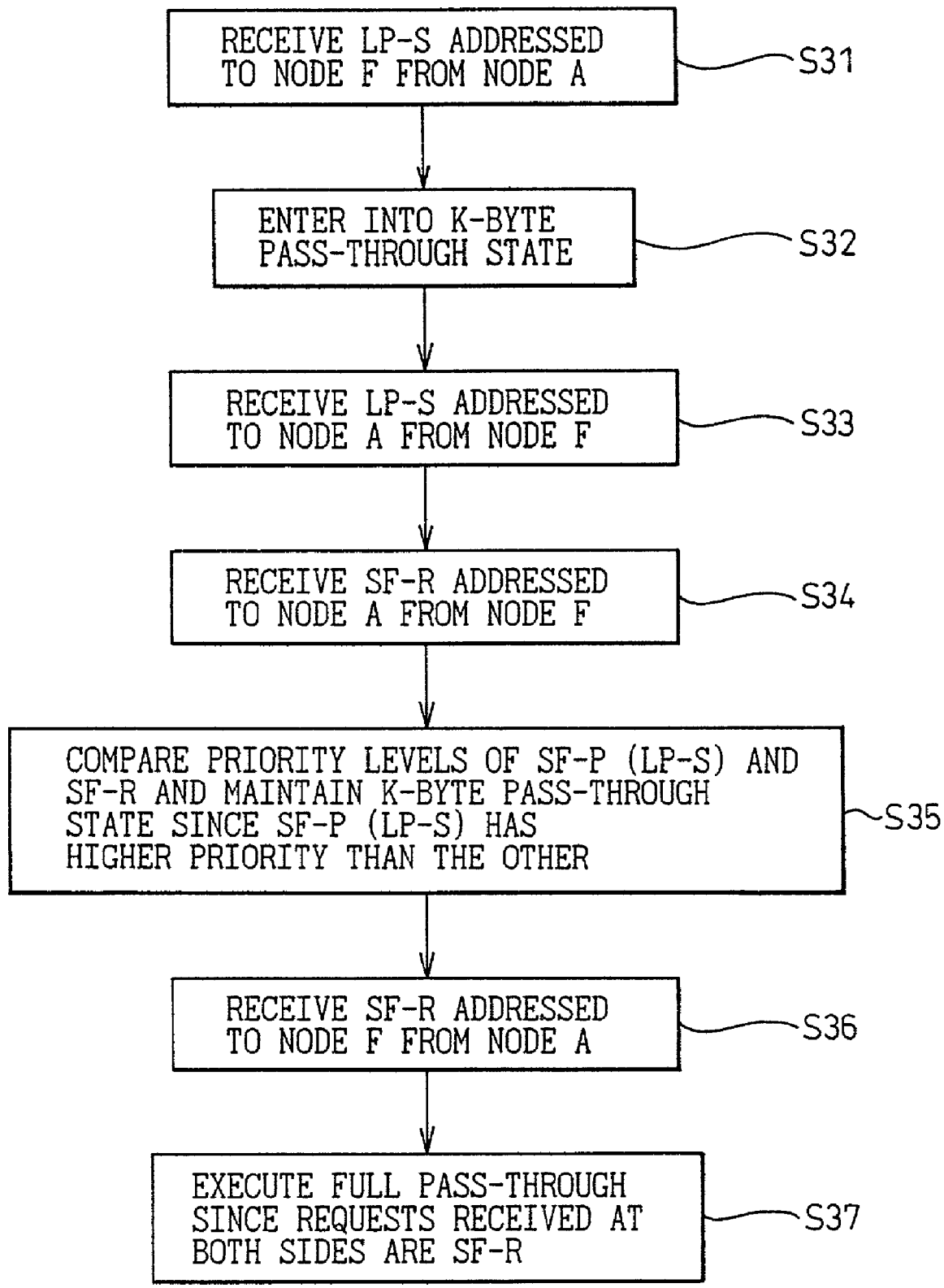
FIG. 6 is a flowchart of an example of the operation of relay nodes in FIG. 4 and FIG. 5.

FIG. 6 is a flowchart of an example of the operations of the relay nodes in FIG. 4 and FIG. 5. Note that the explanation will be made by taking as an example the node B as representative of the relay nodes.

Step S31: The node B of FIG. 4 receives LP-S directed to the node F from the node A as a13 (time T11).

Step S32: The node B enters into the K byte pass-through state.

Step S33: The node B receives LP-S on the long path transmitted directed to the node A from the node F as f12 (time T12).

Thereafter, the node F detects SF-R at the time T31 and transmits f13 and f14.

Step S34: The node B receives SF-R transmitted directed to the node A from the node F as f14 (time T31').

Step S35: When receiving the f14 at step S34, the priority levels of SF-P (LP-S) and SF-R received at the node B are compared. SF-P (LP-S) has a higher priority level than SF-R, so the K byte pass-through state is maintained. Note that, conventionally, the node had entered into the full pass-through state at this time.

Step S36: In FIG. 5, the node B receives SF-R directed to the node F from the node A as a31 at a time T32'.

Step S37: Both of the requests received at the two sides of the node B (Side 1 and Side 2) are SF-R, so the full pass-through state is first entered here.

Next, an explanation will be made of the case where there is a change in the LP-S and SF-P, that is, occurrence thereof or restoration of service, in a certain node in the ring network 1.

Figure 7:
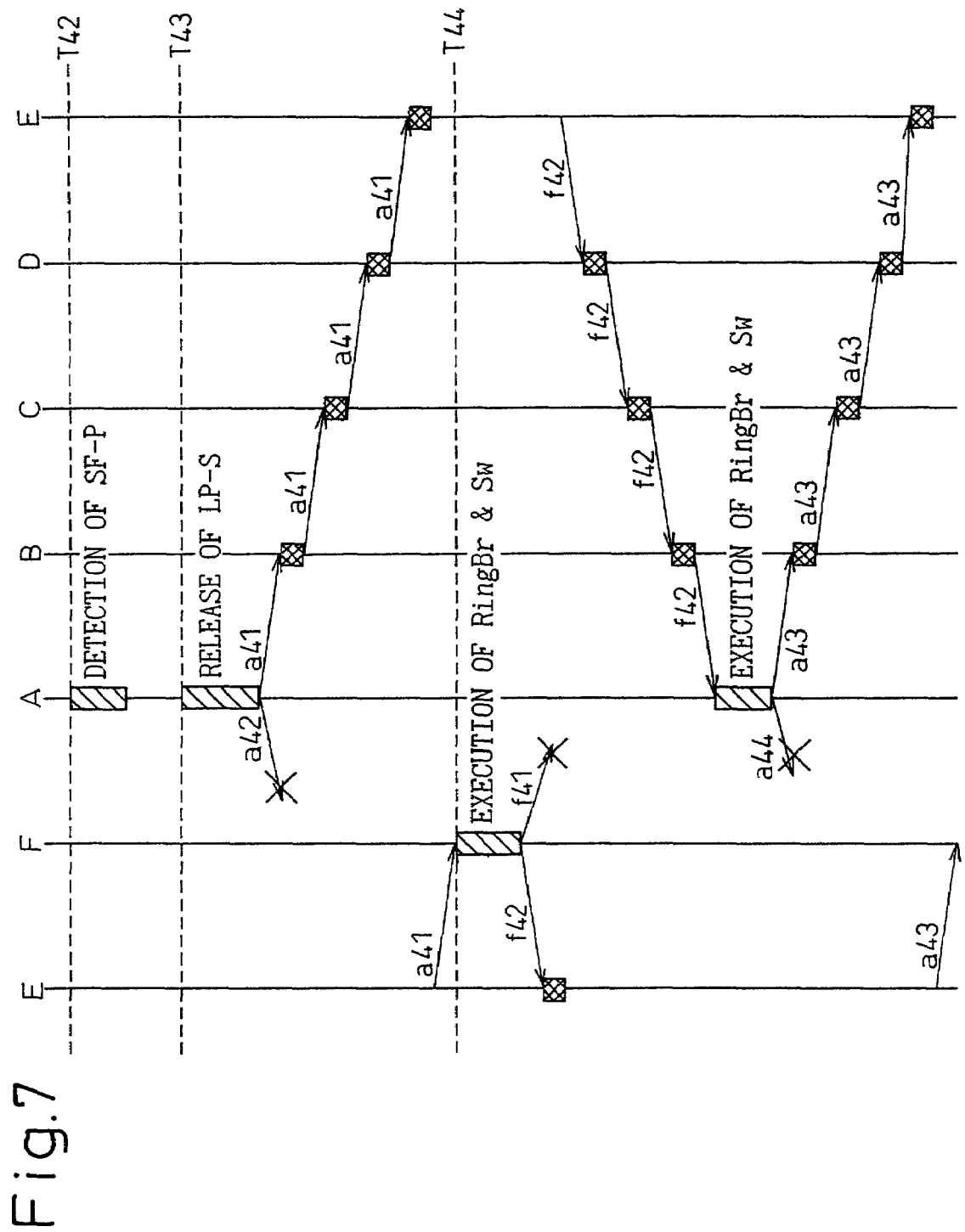
FIG. 7 is a first part of a sequence diagram in a case where LP-S and SF-P change at the node and co-exist with SF-R.
Figure 8:
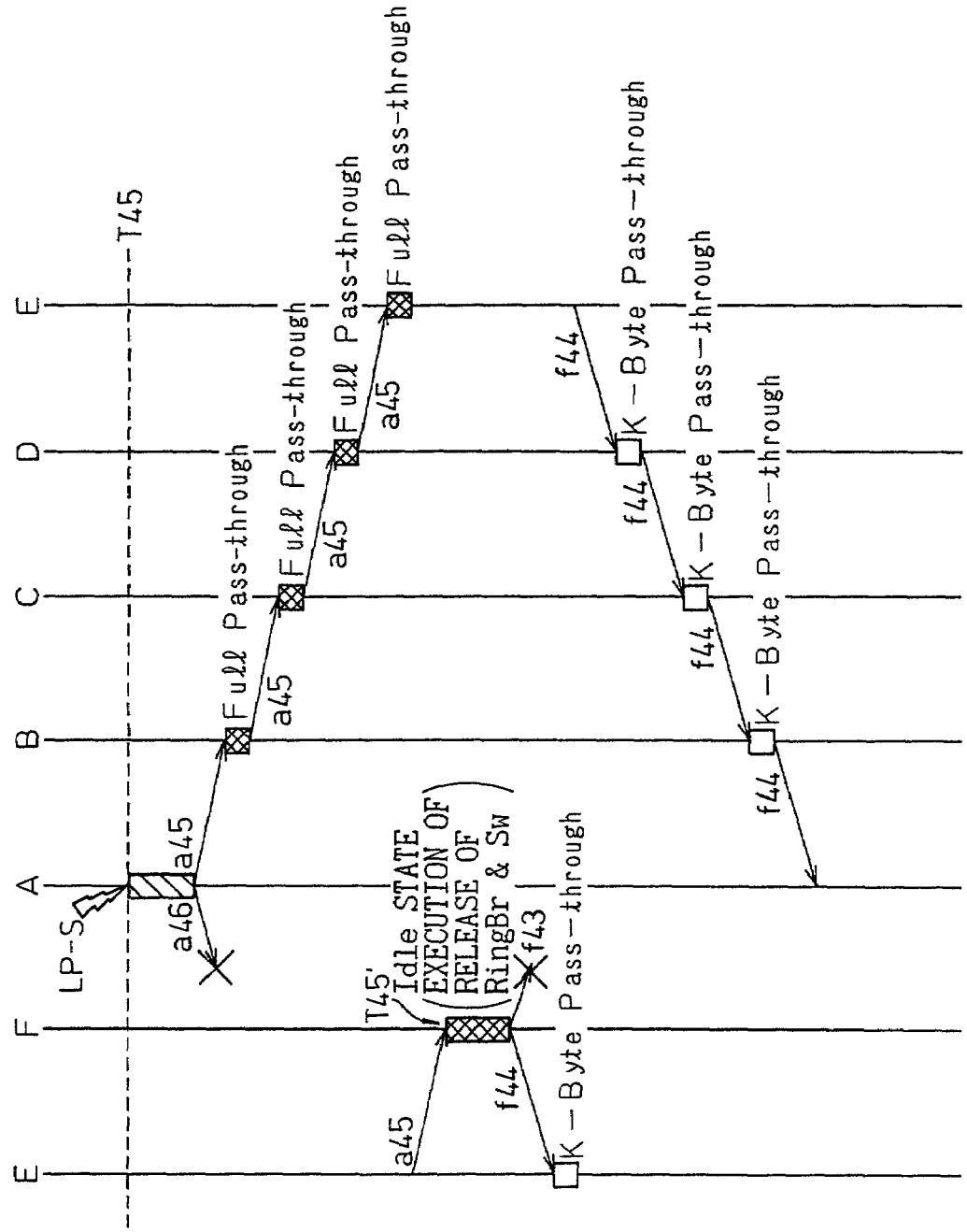
FIG. 8 is a second part of a sequence diagram in a case where LP-S and SF-P change at the node and co-exist with SF-R.

FIGS. 7 and 8 are parts of a sequence diagram of the case where there is a change in LP-S and SF-P at the node and they co-exist with SF-R.

Note that FIG. 7 is a continuation from the sequence shown in FIG. 1 mentioned above. Returning once to FIG. 1, first, there is no failure in the ring network 1, and the K bytes transferred among the nodes are a1, a2, b1, b2, c1, c2, d1, d2, e1, e2, f1, and f2 shown in an upper portion of FIG. 1.

Thereafter, at the time T1, LP-S is input to the node A. The node A executes this LP-S at the span 4 between the node A and the node F.

At this time, the node F receives a4 from the node A and the node F transmits f3 and f4 responding to this (mentioned before).

Further, at the time T21, the node F detects SF-R by the receiving working and protection channels from the node A and executes this SF-R (mentioned before).

Next, assume that SF-P is detected at the node A at a time T42 of FIG. 7. However, this SF-P has the identical code (K=1111) as LP-S, so the K bytes transmitted from the node A to the other nodes do not change.

When assuming that LP-S is released at the node A at the time T43 under such a state, the node A executes SF-R based on the K bytes received from the node F. This SF-R is transmitted as a41 and a42 from the node A to the other nodes.

The node F receives the a41 at a time T44 and executes the ring switch ("Ring Br & Sw" in the figure). Along with this, f41 and f42 are transmitted from the node F, and f42 reaches the node A through the long path. The node A executes the ring switch (Ring Br & Sw) in response to this and transmits a43 and a44 by this.

A time T45 of FIG. 8 is reached from that state. Assume that LP-S is input to the node A again at this time T45. The node A starts to transmit LP-S as a45 and a46 toward the node F in response to this.

The relay nodes (B, C, D, and E) receiving the a45 look at the contents of the f42 (a latter half of FIG. 7) received in opposite directions, that is, SF-R/node A (destination)/node F (source)/long/Br & Sw of FIG. 19 and FIG. 20, and hold the full pass-through state (Full Pass-through in FIG. 8) since the status in the K2 bytes is Br & Sw.

The node F receives the a45 relayed at the time T45' and releases the ring switch (releases "Ring Br & Sw" of FIG. 8). Then, it enters into the idle state ("Idle State" in the figure). Along with this, the node F transmits SF-R as f43 and f44 to the adjacent node A and through the long path to the node A.

The f44 is received at the relay nodes (E, D, C, and B) through the long path. The relay nodes receiving this enter the K byte pass-through state ("K Byte Pass-through" in the figure).

Explaining the operation in FIG. 7 and FIG. 8 further, the relay nodes 2 (B, C, D, and E) other than the two adjacent nodes 2 (A and F) connected to the two ends of the span 4 to be switched enter the full pass-through state by the ring switch request transmitted from one node 2 (A) of the two adjacent nodes 2 (A and F) to the other node 2 (F). When they receive the span switch request directed to the other node 2 (F) from one node 2 (A) under the above entered full pass-through state, they compare the priority levels of the received ring switch request and the span switch request. They enter into the K byte pass-through state allowing only the K bytes to pass therethrough when the span switch request has a higher priority level and the status code according to the ring switch request is not a ring bridge or ring switch.

In the embodiments of FIG. 1 and FIG. 4 mentioned before, the description was made of the case of switching by transmitting SF-R when detecting SF-R, but other than that embodiments, switching can be executed by transmitting EXER-R.

Figure 9:
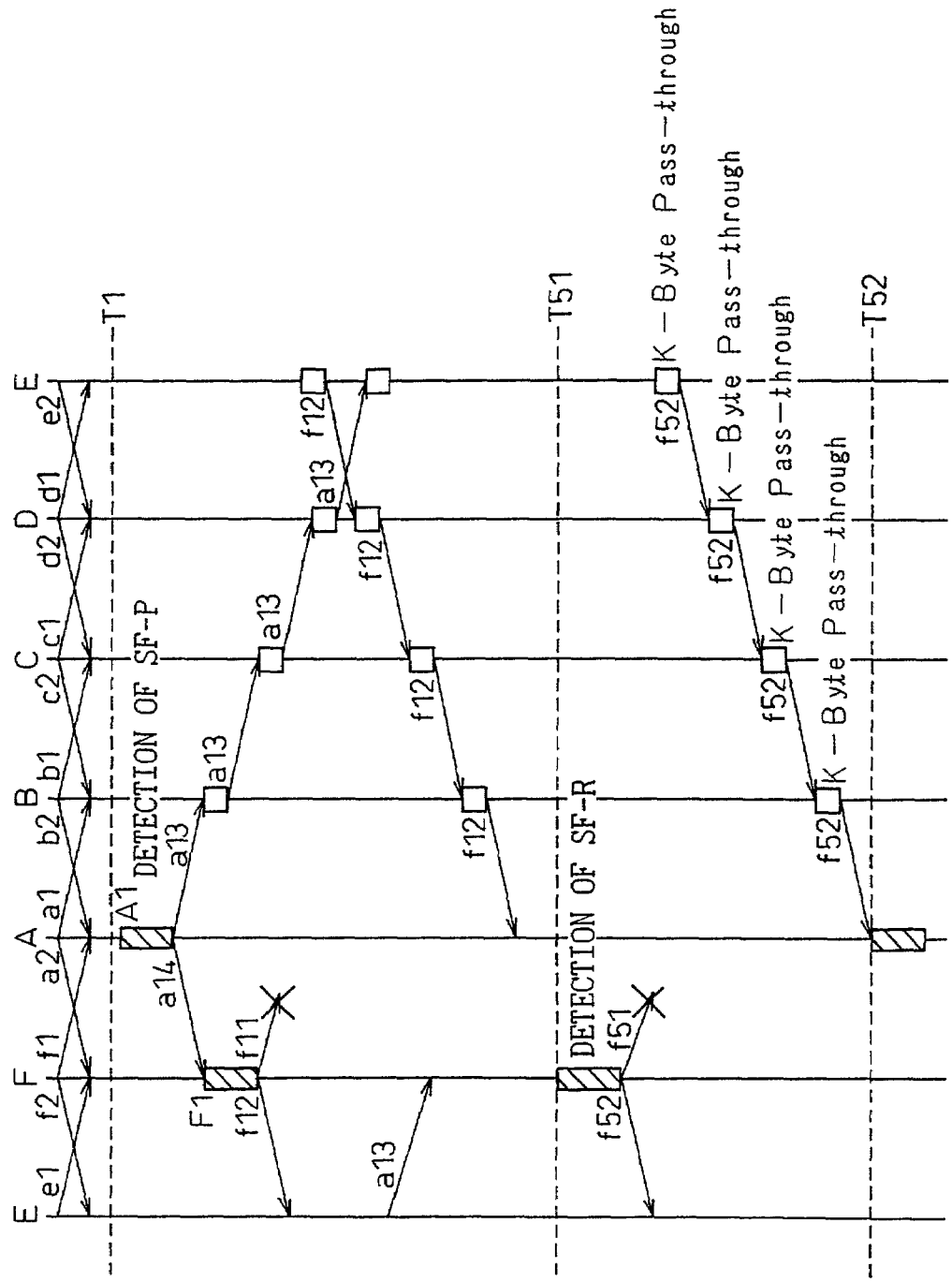
FIG. 9 is a first part of a view of an embodiment for realizing switching by transmitting an EXER-R when detecting SF-R.
Figure 10:
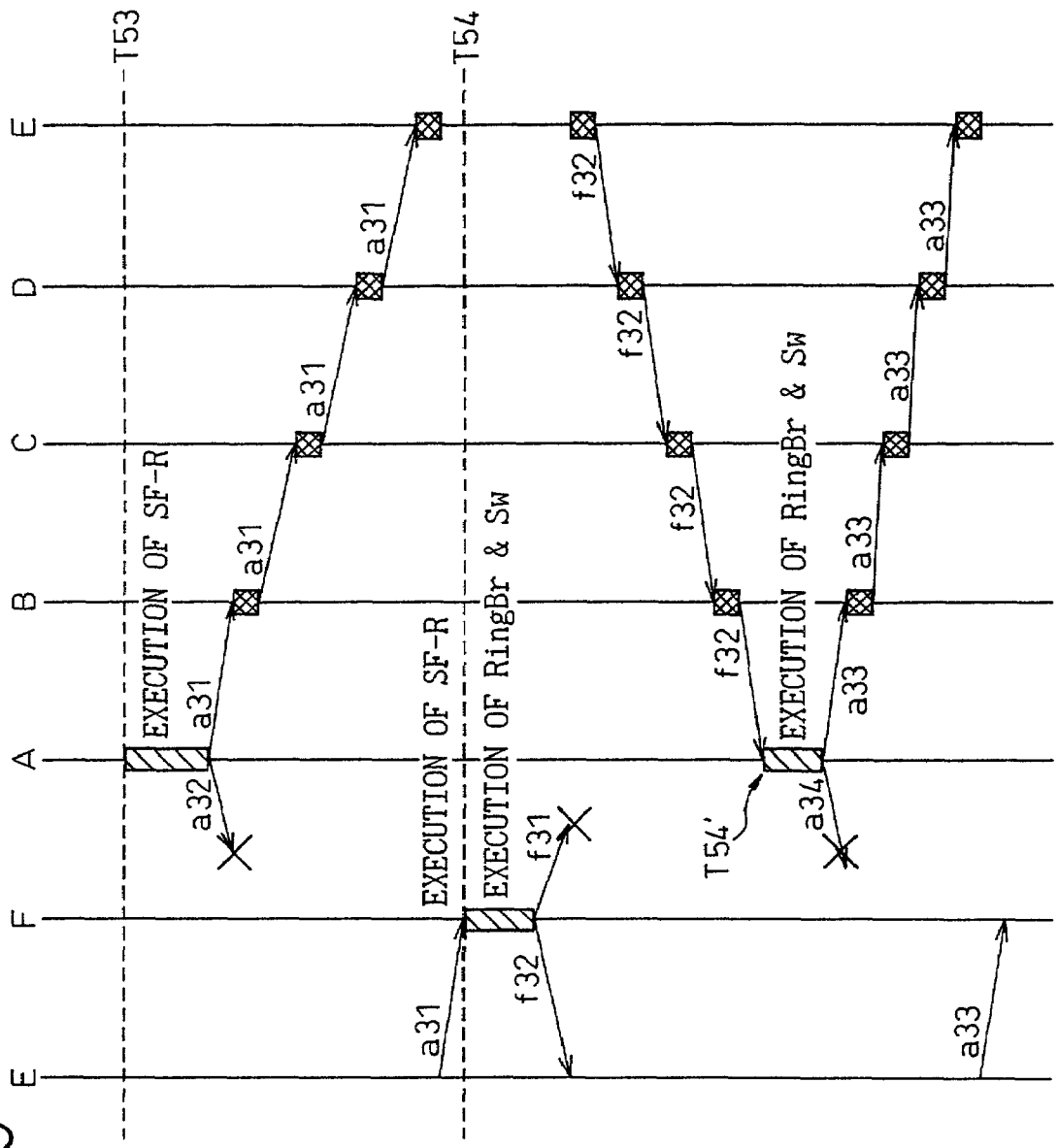
FIG. 10 is a second part of a view of an embodiment for realizing switching by transmitting an EXER-R when detecting SF-R.

FIGS. 9 and 10 are views of an embodiment for switching by transmitting EXER-R when detecting SF-R.

First, in FIG. 9, assume that the node A detects SF-P at the time T1. By this, the node A transmits SF-P as a13 and a14 through the long path and the short path to the node F.

Further, the node F receiving SF-P (a14) transmits f11 and f12 as illustrated.

Next, assume that the node F detects SF-R over the receiving working and protection channels from the node A at a time T51. By this, the node F tries to execute ring switching, but transmits EXER-R as the information of the K bytes to the other nodes. Note that EXER-R can be considered as a test signal of switching. Namely, by sending this EXER-R in the ring network, it can be confirmed if the opposing node is in the switchable state.

The EXER-R is transmitted from the node F as f51 and f52 to the other nodes. f51 is transmitted to the adjacent node A, and f52 is transmitted through the long path to the relay nodes (E, D, C, and B) and then further transmitted to the destination node A.

The relay nodes receiving the f52 receive LP-S and EXER-R, so enter into the K byte pass-through state ("K Byte Pass-through" in FIG. 9).

Referring to FIG. 10 next, the node A receiving f52 at a time T52 at the bottom end of FIG. 9 executes SF-R at a time T53 of FIG. 10 and transmits this SF-R as a31 and a32 through the long path to the nodes B→C→D→E→F and, at the same time, transmits the same to the adjacent node A.

The a31 is received at the node F at a time T54. The node F receiving this executes the ring switch ("execution of Ring Br & Sw" in the figure).

Along with this, the node F transmits SF-R as f31 and f32 toward the node A as illustrated.

When receiving the f32 at a time T54', the node A executes illustrated "Ring Br & Sw" to complete the ring switch.

The operations in the above sequence when taking note of the switch control at the node F and the switch control at the node A are shown in the flowcharts below.

Figure 11:
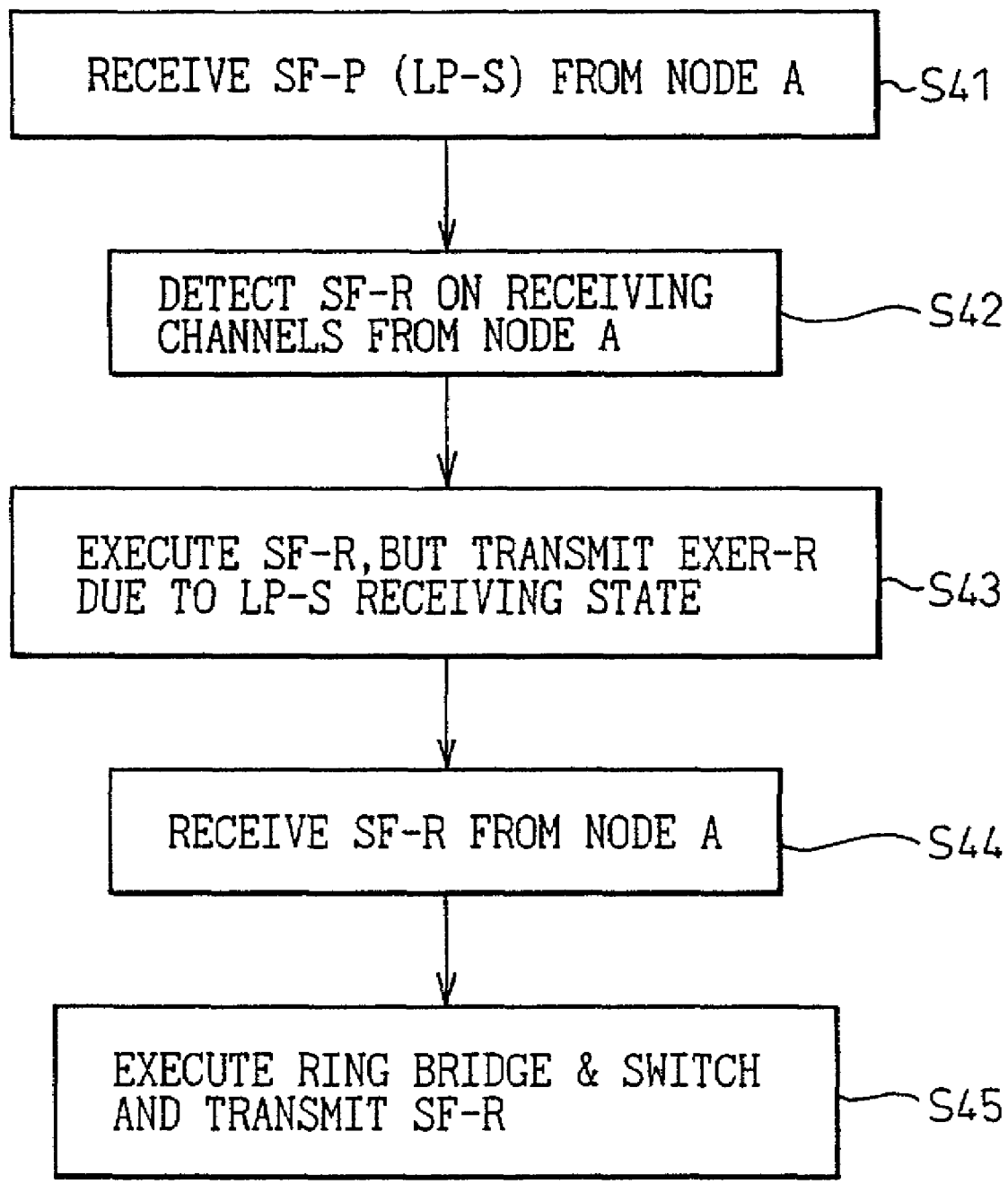
FIG. 11 is a flowchart of the operation of switching control at a node F.
Figure 12:
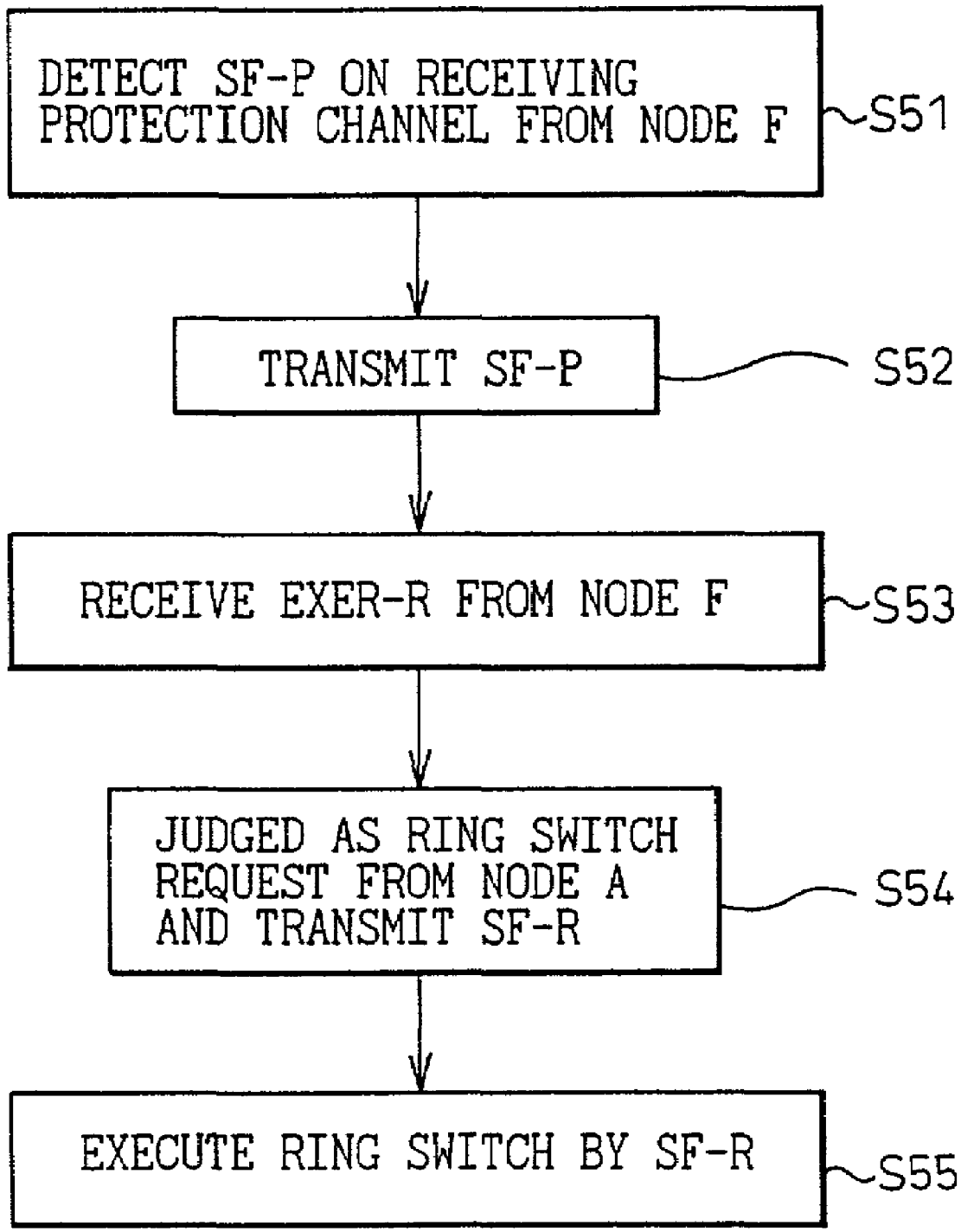
FIG. 12 is a flowchart of the operation of switching control at a node A.

FIG. 11 is a flowchart of the operation of the switch control at the node F, and FIG. 12 is a flowchart of the operation of the switch control at the node A.

First, in FIG. 11,

Step S41: The node F receives SF-P (LP-S) in the period from the time T1 to T51 of FIG. 9.

Step S42: The node F detects SF-R over the receiving channel from the node A at the time T51.

Step S43: While the node F detects the SF-R, the node F is in the LP-S receiving state, so transmits EXER-R as f51 and f52 to the other nodes. The node A receiving this transmits a31 and a32 after the time T53.

One of the characteristic features of the present embodiment resides in the point that the EXER-R is transmitted here.

Step S44: Thereafter, the node F receives the a31 from the node A at T54. That is it receives SF-R.

Step S45: Next, the node F executes "Ring Bridge & Switch" and transmits SF-R as f31 and f32 to the other nodes.

Next, referring to FIG. 12,

Step S51: The node A detects SF-P over the receiving protection channel at the time T1 of FIG. 9.

Step S52: The node A transmits SF-P as a13 and a14 to the other nodes.

At the time T51 of FIG. 9, the node F transmits f51 and f52 due to the detection of SF-R. This f51 and f52 are the EXER-R.

Step S53: The node A receives EXER-R from the node F, that is, the f52 at the time T52.

Step S54: In FIG. 10, the node A judges the request to be a ring switch request from the node A (after the time T53) and transmits SF-R as a31 and a32 to the other nodes.

The node F receiving the a31 executes the ring switch and transmits f31 and f32 (after the time T54).

Step S55: The node A receives the f32 and realizes the ring switch at the time T54'.

When considering FIG. 9 to FIG. 12 mentioned above, according to FIG. 9, the invention provides a method for controlling switching in a bidirectional line-switched ring network configured by a plurality of optical fibers 3 and a plurality of nodes 2, (i) having a first node receive as input an LP-S (lockout of protection (span)) command and having a second node adjacent to the first node across a span receive the LP-S through the optical fibers, and (ii) having the second node 2 send a switch request of EXER-R (Exerciser (ring)) to other nodes when the second node further detects SF-R (Signal Fail (ring)) in the span under the above state (i).

Alternatively, the invention provides a method for controlling switching in a bidirectional line-switched ring network configured by a plurality of optical fibers 3 and a plurality of nodes 2, (i) having the first node detect SF-P (signal fail (protection)) and having the second node adjacent to the first node across a span receive that SF-P via the optical fiber, and (ii) having the second node transmit a switch request EXER-R (exerciser (ring)) to the other nodes when the second node further detects SF-R (signal fail (ring)) in the span under the above state (i).

Further, according to FIG. 10, the present invention provides a method of controlling switching in a bidirectional line-switched ring network 1 configured by a plurality of optical fibers 3 and a plurality of nodes 2, having a first node of the first node and a second node adjacent thereto across a span to be switched transmit a switch request SF-R (signal fail (ring)) when receiving a switch request EXER-R (exerciser (ring)) from the second node while the first node is executing a switch request SF-P (signal fail (protection)).

The last embodiment differentiates between LP-S and SF-P in the same K byte. Namely, when selectively transmitting at least the switch request LP-S (lockout of protection (span)) and the switch request SF-P (signal fail (protection)) from the node connected to the span to be switched by utilizing the K bytes, the LP-S and SF-P are differentiated by using an unused bit region in a K byte.

Referring to FIG. 17 again, note bits 6 to 8 in the K2 byte.

FIG. 13 is a view of an example where LP-S and SF-P are differentiated by utilizing the K2 byte.

According to GR1230-CORE, 100 and 101 of the K2 byte are reserved for future use. These portions are newly utilized as in FIG. 13 to enable clear differentiation of LP-S from SF-P.

In actual operation, when the node recognizes LP-S, it is sufficient to perform the operation of FIG. 23, while when it recognizes SF-P, the operations according to FIG. 26 and FIG. 27 are carried out. By this, a normal switch operation can be realized.

As explained above, according to the present invention, first, it is possible to solve the problem that the first 4 bits of the K1 byte indicating a switch request are "1111" in both the LP-S and SF-P, so these cannot be differentiated and in some cases, even if there is a request for ring switch on the identical span, the ring switch cannot be executed.

Second, it is possible to solve the problem that during the execution of LP-S, the user receiving special communication service (protection channel access: PCA) can no longer use a protection channel in use for the PCA.

Third, it is possible to solve the problem that if there is a change in a switch request after an LP-S or SF-P switch request, the change cannot be quickly followed up on.

While the invention has been described by reference to specific embodiments chosen for purposes of illustration, it should be apparent that numerous modifications could be made thereto by those skilled in the art without departing from the basic concept and scope of the invention.

What is claimed is:

1. A method for controlling switching in a bidirectional line-switched ring network configured with a plurality of optical fibers and a plurality of nodes where a switch request is transferred by using only K bytes,
   wherein
   (a) under a first state where a first node receives as input an LP-S (lockout of protection (span)) command and a second node adjacent to the first node receives the switch request from the first node via the optical fibers, said method comprises the steps of:
      i) when the second node detects a failure on a line over which the second node receives a signal from the first node, and receives the switch request but cannot differentiate—by the K bytes therein—whether the switch request contains the LP-S command or an SF-P, signal fail protection, command the second node transmitting a ring switch request to one or more other of the plurality of nodes; and
      ii) each of the one or more other nodes that receives the ring switch request placing a protection channel of itself in a K byte pass-through state allowing only the K bytes to pass therethrough, and
   wherein
   (b) under a second state where the first node detects a failure in a receiving protection channel from the adjacent second node and the second node receives the switch request from the first node via, the optical fibers, said method comprises steps i) and ii) and further comprises the steps of:
      iii) the first node transmitting the ring switch request to the one or more other nodes after receiving the ring switch request from the second node;
      iv) each of the one or more other nodes that receives the ring switch request placing the protection channel of itself in a full pass-through state to connect one span on one side and another span on another side thereof;
      v) the second node, after receiving the ring switch request from the first node, executing a ring switch and transmitting the ring switch request; and
      vi) the first node executing the ring switch after receiving the ring switch request from the second node.

\* \* \* \* \*